United States Patent
Meadows et al.

(10) Patent No.: US 11,708,550 B2
(45) Date of Patent: *Jul. 25, 2023

(54) METHOD AND APPARATUS FOR TREATING AND PRODUCING NON-WINE ALCOHOLIC BEVERAGES WITH REDUCED NOXIOUS CONSTITUENTS

(71) Applicant: Purewine Inc., Colleyville, TX (US)

(72) Inventors: David Meadows, Colleyville, TX (US); Howard Ketelson, Dallas, TX (US)

(73) Assignee: Purewine Inc., Grapevine, TX (US)

( * ) Notice: Subject to any disclaimer, the term of this patent is extended or adjusted under 35 U.S.C. 154(b) by 64 days.

This patent is subject to a terminal disclaimer.

(21) Appl. No.: 16/920,878

(22) Filed: Jul. 6, 2020

(65) Prior Publication Data
US 2020/0332236 A1    Oct. 22, 2020

Related U.S. Application Data

(60) Continuation of application No. 16/794,421, filed on Feb. 19, 2020, which is a division of application No. (Continued)

(51) Int. Cl.
*C12H 1/04* (2006.01)
*B01D 15/36* (2006.01)
(Continued)

(52) U.S. Cl.
CPC ......... *C12H 1/0432* (2013.01); *B01D 15/361* (2013.01); *C12G 1/00* (2013.01);
(Continued)

(58) Field of Classification Search
CPC .... B01D 15/361; B01D 15/36; C12H 1/0432; C12H 1/04; C12H 1/14; C12G 1/00;
(Continued)

(56) References Cited

U.S. PATENT DOCUMENTS

| 2,749,307 A | 6/1956 | Ellison |
| 4,764,271 A | 8/1988 | Acosta |

(Continued)

FOREIGN PATENT DOCUMENTS

| DE | 3304152 A1 | 2/1983 |
| EP | 2021289 B1 | 12/2011 |

(Continued)

OTHER PUBLICATIONS

"SO2GO The Product That's Sweeping the World"; http://so2go.co.nz/, 2 pgs.

(Continued)

*Primary Examiner* — Akash K Varma

(57) ABSTRACT

Treating a non-wine alcoholic beverage including: exposing the non-wine alcoholic beverage to an ion exchange matrix. The ion exchange matrix includes a mixture of cation exchange media and anion exchange media that includes: (1) cation exchange media that are in hydrogen form, (2) cation exchange media that are in mineral form comprising potassium mineral form, (3) anion exchange media that are in hydroxide form, and (4) anion exchange media that are in chloride mineral form. The exposing results in: binding ions of the mixture to one or more cationic or anionic constituents present in the pretreated beverage, reducing concentrations of the one or more cationic or anionic constituents in the beverage and maintaining a conductivity value of the treated beverage equal to or greater than the pretreated beverage's conductivity value. An apparatus for treating a non-wine alcoholic beverage and a treated non-wine alcoholic beverage prepared by a process are also disclosed.

6 Claims, 16 Drawing Sheets

Related U.S. Application Data

15/588,467, filed on May 5, 2017, now Pat. No. 10,611,989, which is a division of application No. 14/610,203, filed on Jan. 30, 2015, now Pat. No. 9,670,442, which is a continuation of application No. PCT/US2014/048451, filed on Jul. 28, 2014.

(60) Provisional application No. 61/859,373, filed on Jul. 29, 2013.

(51) Int. Cl.
*C12G 1/00* (2019.01)
*B01J 47/04* (2006.01)
*B01J 47/012* (2017.01)
*B01J 47/018* (2017.01)

(52) U.S. Cl.
CPC ............ *B01J 47/012* (2017.01); *B01J 47/018* (2017.01); *B01J 47/04* (2013.01)

(58) Field of Classification Search
CPC ........ B01J 47/012; B01J 47/018; B01J 47/04; A23L 2/78
USPC ....................................................... 426/592
See application file for complete search history.

(56) References Cited

U.S. PATENT DOCUMENTS

| | | | |
|---|---|---|---|
| 4,775,541 A | 10/1988 | Brown et al. | |
| 5,071,664 A * | 12/1991 | Brown | C12H 1/0432 426/271 |
| 6,001,406 A | 12/1999 | Katzke et al. | |
| 2006/0088632 A1* | 4/2006 | Armes | C12H 1/04 426/271 |
| 2007/0196546 A1* | 8/2007 | Tarantino | C12G 1/04 426/271 |
| 2007/0224313 A1 | 9/2007 | Stauffer et al. | |
| 2008/0282908 A1 | 11/2008 | Cole et al. | |
| 2009/0291171 A1* | 11/2009 | Bellamy | A23L 2/78 426/271 |
| 2013/0084358 A1 | 4/2013 | Tams et al. | |
| 2015/0030732 A1 | 1/2015 | Meadows et al. | |

FOREIGN PATENT DOCUMENTS

| | | | | |
|---|---|---|---|---|
| GB | 2292157 A | * | 2/1996 | ............... C12H 1/04 |
| RU | 2010110389 A | | 9/2011 | |
| WO | 2015017338 A2 | | 2/2015 | |

OTHER PUBLICATIONS

"Sulfites"; Organic Wines and Sulfites; Organic Wine Company; www.ecowine.com/sulfites.htm; Jul. 3, 2008; 3 pgs.
"Your Vinturi Deserves a Tower"; Oct. 6, 2009; 2 pgs.
A300 Product Data Sheet; Purolite®; Jul. 13, 2016; 2 pgs.
A500/2788 Product Data Sheet; Purolite®; Jul. 13, 2016; 1 pg.
Amberlite™ IR120 Product Data Sheet, PDS 0210 A; Rohm and Haas; Apr. 1997; 2 pgs.
Amberlite™ IRA900 CI Product Data Sheet; PDS 0295 A; Rohm and Haas; Jan. 2008; 2 pgs.
Amberlite™ IRA958 CI Product Data Sheet; PDS 0431 A; Rohm and Haas; Jan. 2008; 2 pgs.
C100 Product Data Sheet Purolite®; Jul. 13, 2016; 1 pg.
Dickert, C.; "Ion Exchange"; Kirk Othmer Encyclopedia of Chemical Technology; John Wiley & Sons; Published Online Dec. 4, 2000; 50 pgs.
DOWEX 88 Product Information; Form No. 177-01684-0705; Dow Chemical Company; 2 pgs.
DOWEX™ 22 Product Information; Form No. 177-01681-0408; Dow Chemical Company; 2 pgs.
DOWEX™ 66 Product Information; Form No. 177-01682-0606; Dow Chemical Company; 2 pgs.
DOWEX™ MONOSPHEREm 77; Product Information; Form No. 177-01710-0209; Dow Chemical Company; 2 pgs.
Held, P., et al.; "Histamines"; Bio Teck Instruments; Aug. 29, 2006; 7 pgs.
Maintz, L., et al.; "Histamine and Histamine Intolerance"; The American Journal of Clinical Nutrition; vol. 85; 2007; pp. 1185-1196.
Wantke, F., et al.; "The Red Wine Provocation Test: Intolerance to Histamine as a Model for Food Intolerance"; Allergy Proc.; vol. 15, No. 1; Jan.-Feb. 1994; pp. 27-32.
Horak, et al.; "Procedure to Reduce Sulphite in Wine with Anion-Exchange Resin"; ACTA Universitatis Agriculturae et Silviculturae Mendelianae Brunensis; vol. LX, Nov. 8, 2012; 8 pgs.
Jarisch, et al.; "Mini Review-Wine and Headache"; International Archives of Allergy and Immunology; Journal of Innate Immunity, Precision Medicine; 1996; 5 pgs. https://doi.org/10.1159/000237304.

* cited by examiner

METHOD AND APPARATUS FOR TREATING AND PRODUCING NON-WINE ALCOHOLIC BEVERAGES WITH REDUCED NOXIOUS CONSTITUENTS

CROSS-REFERENCE TO RELATED APPLICATION

This application is a continuation of U.S. patent application Ser. No. 16/794,421, filed Feb. 19, 2020, entitled "TREATED WINE BEVERAGES WITH REDUCED NOXIOUS CONSTITUENTS" which is a divisional of U.S. patent application Ser. No. 15/588,467, filed May 5, 2017, entitled "TREATMENT OF BEVERAGES TO REDUCE THE EFFECTS OF NOXIOUS CONSTITUENTS," now U.S. Pat. No. 10,611,989 issued Apr. 7, 2020, which is a divisional of U.S. patent application Ser. No. 14/610,203, filed Jan. 30, 2015, entitled "TREATMENT OF BEVERAGES TO REDUCE THE EFFECTS OF NOXIOUS CONSTITUENTS," now U.S. Pat. No. 9,670,442 issued Jun. 6, 2017, which is a bypass continuation application of international application PCT/US2014/048451, filed Jul. 28, 2014, entitled "TREATMENT OF BEVERAGES TO REDUCE THE EFFECTS OF NOXIOUS CONSTITUENTS," which claims benefit of U.S. Provisional Application No. 61/859,373, filed Jul. 29, 2013 entitled "TREATMENT OF BEVERAGES TO REDUCE THE EFFECTS OF NOXIOUS CONSTITUENTS," the disclosures of which are all incorporated by reference herein in their entirety.

TECHNICAL FIELD

This application is directed, in general, to the treatment of beverages, more specifically, to treating beverages to reduce the effects of noxious constituents present in beverages and to apparatuses to facilitate such treatments and the treated beverages.

BACKGROUND

A large segment of the population currently consumes beverages. However, in certain segments of the population, consuming beverages can produce negative symptoms. Such negative symptoms can include facial flush, nasal congestion, voice change, headache and/or allergy symptoms, and in some cases, an extreme allergic reaction resulting in death.

The noxious constituents causing these symptoms, however, can be naturally occurring endogenous byproducts, and, can play a beneficial role in the fermentation process to produce certain beverages, such as certain alcoholic beverages. For instance, sulfites can cause asthma and allergies, but, sulfites are naturally occurring byproducts of yeast fermentation and helps delay spoilage of the beverage. Histamines, another naturally occurring fermentation byproduct, trigger headaches in some people (e.g., with diamine oxidase deficiency). Tyramine can cause an increase in blood pressure, which triggers headaches in some people, and, tyramine is another fermentation byproduct. Tannins may trigger the release of serotonin, which can cause headaches in some people, and, tannins are components of the wood containers in which beverages can be fermented and stored.

Consequently, because they are naturally occurring, and in some cases, beneficial, it can be undesirable to remove or prevent the formation of such noxious constituents during the fermentation process and subsequent storage of beverages. Alternatively, the removal of such noxious constituents from the final beverage product, e.g., just prior to consumption, can have adverse effects on the quality of the beverage. Non-limiting examples of such adverse effects include undesirable changes to the taste, aroma, or color of the beverage, such as wine.

Accordingly, what is needed in the art is a simplified consumer-friendly treatment of beverages to reduce the effects of noxious constituents that does not suffer from the disadvantages associated with the conventional treatments discussed above.

SUMMARY

To address the above-discussed deficiencies, one embodiment is a method of treating a beverage. The method comprises exposing a beverage to an ion exchange matrix that includes a mixture of cation exchange beads and anion exchange beads each capable of binding to one or more cationic or anionic constituents present in the beverage and thereby reduce concentrations of the one or more cationic or anionic constituents in the beverage and capable of maintaining a pH of the beverage within ±0.5 pH units of the beverage's pretreatment pH value, wherein the cationic or anionic constituents have a noxious effect on humans and the cation exchange beads include a cationic mineral form and the anion exchange beads include a chloride mineral form. In any such embodiments the cation exchange beads can be capable of binding cationic noxious constituents that include histamines, and, the anion exchange beads can be capable of binding anionic noxious constituents that include sulfites. Any such embodiments can further include the cation exchange beads in a hydrogen form, and, the anion exchange beads in a hydroxide form. Any such embodiments can also the cationic mineral form including one or more of potassium, calcium, magnesium, iron or copper mineral forms, and, the anionic mineral form including a in the chloride form. In any such embodiments the anionic exchange beads are in the chloride form and include trimethylamine functional groups, and, the cation exchange beads are in a cationic mineral form that include one or more of potassium, calcium, magnesium, iron or copper mineral forms and include sulfonic acid functional groups. In any such embodiments the mixture of cation exchange beads and the anion exchange beads are capable of maintaining a conductivity of the beverage equal to or greater than the beverage's pretreatment conductivity value. In any such embodiments the ion exchange matrix can include anti-allergenic ingredient bound thereto, the anti-allergenic ingredient being released from the ion exchange matrix when the beverage is exposed to the ion exchange matrix.

Another embodiment is an apparatus for treating beverages. The apparatus comprises a container that holds an ion exchange matrix therein. At least part of the container includes a screen that prevents the passage of ion exchange matrix there-through and permits the passage of a beverage there-through, wherein the ion exchange matrix includes a mixture of cation exchange beads and anion exchange beads. The ion exchange matrix includes a mixture of cation exchange beads and anion exchange beads each capable of binding to one or more cationic or anionic constituents in the beverage and capable of maintaining a pH of the beverage within ±0.5 pH units of the beverage's pretreatment pH value, wherein the cationic or anionic constituents have a noxious effect on humans and the cation exchange beads include a cationic mineral form and the anion exchange beads include a chloride mineral form.

In some such embodiments the container can be a bag having walls that include the screen, the bag configured to be submerged into a volume of liquid of the beverage. In some such embodiments the container can be a cartridge having an input end with an input opening and an output end with an output opening, first and second portions of the screen covering the input opening and the output opening, respectively. In some such embodiments the first and second screen portions are held by an input cap and an output cap, respectively, the caps capable of being removeably attached to the cartridge. In some embodiments, the mixture of cation exchange beads and the anion exchange beads are capable of maintaining a conductivity of the beverage equal to or greater than the beverage's pretreatment conductivity value.

Another embodiment is a beverage. The beverage comprises a treated volume of a liquid alcoholic beverage that has been exposed to an ion exchange matrix that includes a mixture of cation exchange beads and anion exchange beads capable of binding one or more noxious ionic constituents present in the beverage and the cation exchange beads include a cationic mineral form and the anion exchange beads include a chloride mineral form. The treated volume of liquid has a total sulfites concentration reduced by at least about 25 percent, or, a total histamines concentration reduced by at least about 25 percent as compared to an untreated volume of the liquid alcoholic beverage a pH of the beverage is maintained within ±0.5 pH units of the beverage's pretreatment pH value.

In some embodiments the alcoholic beverage can be a wine that was formed in a fermentation process. In some embodiments the alcoholic beverage is a beer that was formed in a fermentation process. In some such embodiments, the total sulfites concentration in the treated volume of the liquid alcoholic beverage is about 300 ppm or less, or, the total histamines concentration is about 30 ppm or less. In some such embodiments, the total sulfites concentration in the treated volume of the liquid alcoholic beverage is about 50 ppm or less, or, the total histamines concentration is about 10 ppm or less.

In some such embodiments, the noxious ionic constituents include a total tyramine concentration in the treated volume of the liquid alcoholic beverage equal to about 10 ppm or less. In some such embodiments, the noxious ionic constituents include a total tannin concentration in the treated volume of the liquid alcoholic beverage equal to about 2000 ppm or less.

BRIEF DESCRIPTION OF FIGURES

For a more complete understanding of the present disclosure, reference is now made to the following detailed description taken in conjunction with the accompanying FIGUREs. It is emphasized that various features may not be drawn to scale. In fact, the dimensions of various features may be arbitrarily increased or reduced for clarity of discussion. Reference is now made to the following descriptions taken in conjunction with the accompanying drawings, in which.

DETAILED DESCRIPTION

Embodiments of the present disclosure benefit from the recognition that an ion exchange matrix can provide an inexpensive and efficient means to remove noxious constituents from beverages and thereby reduce or eliminate the above-described negative symptoms in certain segments of the population. In particular, ion exchange matrixes are effective in the treatment of beverages after their final production and bottling. Moreover, some embodiments of the ion exchange matrix can be specific for the removal of one or more of the noxious constituents without removing other constituents, whose removal could adversely affect the quality of the beverage.

A consequence of the recognition that an ion exchange matrix can be used to treat beverages in removing these noxious constituents is that several properties of the ion exchange bead are newly discovered result-effective variables that influence the treatment of beverages, as further discussed below. Non-limiting examples of such variables include: the concentration of functional anionic and/or cationic exchanging sites in the ion exchange beads; the binding constant of the exchanging sites in the ion exchange matrix (e.g., weak versus strong cationic and/or anionic binding sites); the rates of mass transfer exchange between ionic species bound to ion exchange matrix and ionic species of noxious constituents in the beverage; the size and porosity of the ion exchange beads; in some cases, proportions of cationic and anionic exchange beads in mixed bed embodiments of the ion exchange bead; in some cases, the flow rates of the beverage through beds of the ion exchange beads.

The term beverage as used herein, refers to alcoholic beverages, or, non-alcoholic beverages, such as fruit or vegetable juices (e.g., pulp-free or strained juices, in some cases) or teas and coffees. The term alcoholic beverage, as used herein, refers to a volume of liquid that has gone through fermentation process to generate ethanol for consumption by humans. Non-limiting examples of alcoholic beverages include wines, beers, brandy, whisky, ciders, spirits or other beverages fermented from grains, grapes, apples or similar plants familiar to those skilled in the pertinent arts.

The term noxious constituents as used herein, refers to one or more of sulfites, histamines, tyramines, tannins or similar compounds present in beverages and known to trigger headaches, facial flushing, asthma or other allergic symptoms, or bitter taste or other undesirable favors, characteristic of drinking the beverages described herein.

The term ion exchange matrix as used herein refers to beads, particles, meshes or other structures whose surfaces contain or are coated with ion exchange groups thereon.

Figure 1:
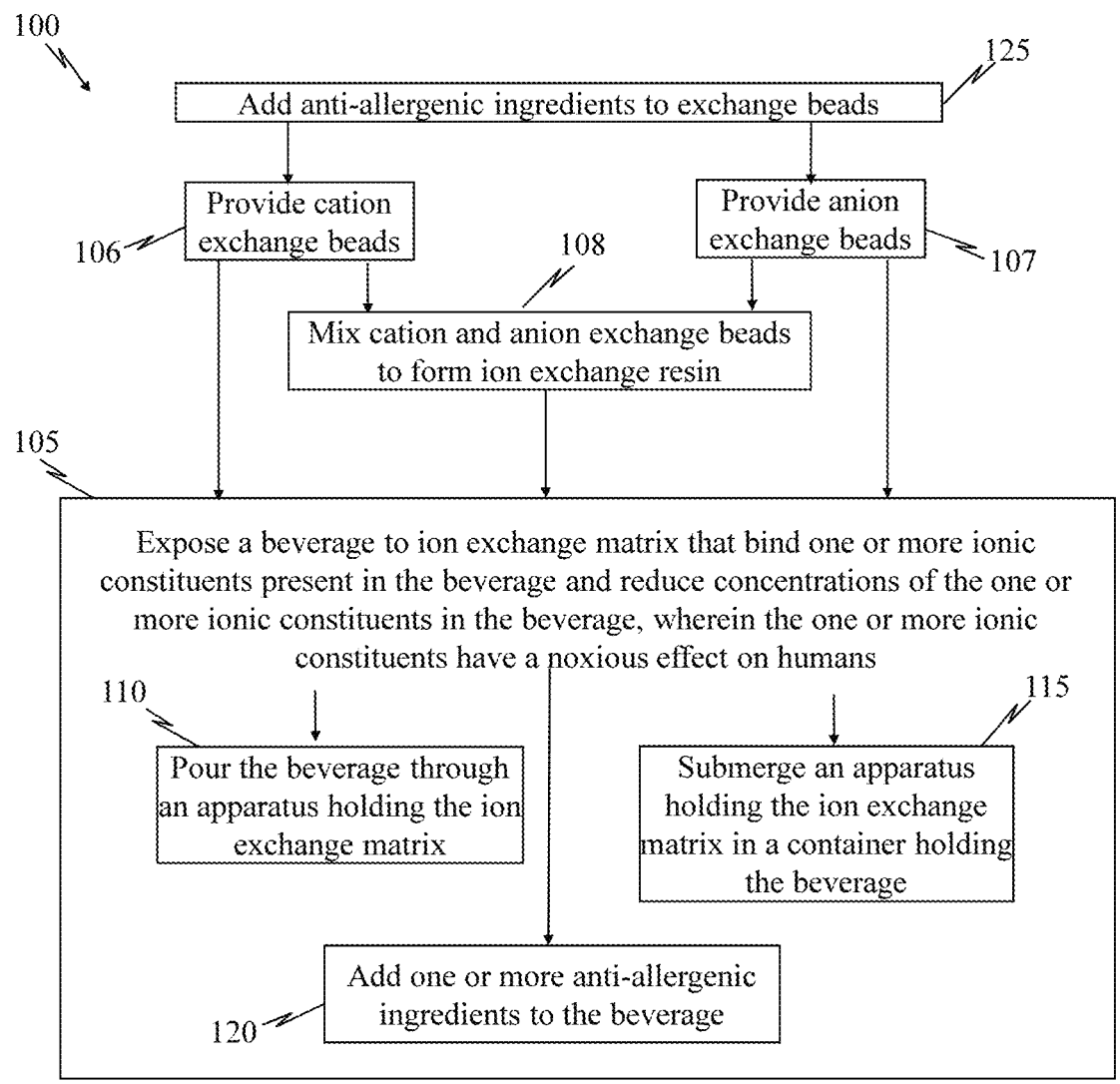
FIG. 1 illustrates by flow diagram, selected steps of an example method of treating a beverage according to the principles of the present disclosure.

One embodiment is a method of treating a beverage. FIG. 1 illustrates by flow diagram, selected steps of an example method 100 of treating a beverage, according to the principles of the present disclosure.

An advantage of the treatment using ion exchange matrix in accordance with the method 100 is that, in some cases, no significant change the beverages', e.g., an alcoholic beverages', production and storage is necessary to implement the method. This is in contrast to certain alternative approaches, such as the use of alternative preservatives to replace sulfites, using modified yeast strains to produce less sulfite while reducing the fermentation temperature, or, using a biocatalyst for removing sulfites from certain alcoholic beverages, such as wines.

The method 100 comprises a step 105 of exposing the beverage to an ion exchange matrix that binds one or more ionic constituents present in the beverage and reduces concentrations of the one or more ionic constituents in the beverage. The ionic constituents have a noxious effect on humans. That is, the ionic constituents correspond to one or both of cationic or anionic forms of the one or more of the noxious constituents. For example, in some embodiments, the concentrations of one or more of the ionic noxious constituents in the treated beverage is reduced by at least about 25 percent, and in some embodiments, at least about 50 percent, and in some embodiments, at least about 75 percent as compared to the concentration of the ionic noxious constituents in the untreated beverage prior to its exposure to the ion exchange matrix.

In some embodiments, as part of the exposing step 105, in step 110, the beverage can be poured through an apparatus holding the ion exchange beads. In other embodiments, as part of step 105, the ion exchange matrix (e.g., held in an apparatus having a screen can, in step 115, be submerged into a container holding the beverage. Embodiments of such apparatuses are discussed below in the context of FIGS. 2 and 3.

In some embodiments, the ion exchange matrix includes cation exchange beads (e.g., provided in step 106), and in such embodiments, cationic noxious constituents (e.g., histamines) bind to the cation exchange matrix and are thereby reduced in concentration in the beverage. Non-limiting example embodiments of such cation exchange beads include strong acid cation exchange resin beads in the hydrogen form. In other embodiments, however, weak acid cation exchange resin beads in the hydrogen form, or, strong or weak cation exchange resin beads in mineral forms (e.g., potassium, calcium, magnesium, iron and/or copper) may be used. In some embodiments, the cation exchange beads can be functionalized with strong acid groups such as sulfonic acid or other similar groups familiar to those skilled in the pertinent arts.

In some embodiments, the ion exchange matrix includes anion exchange beads (e.g., provided in step 107), and in such embodiments, anionic noxious constituents (e.g., sulfites) bind to the anion exchange beads and are thereby reduced in concentration in the beverage. Non-limiting example embodiments of such anion exchange beads include strong base anion exchange resin beads in the hydroxide form. In other embodiments, however, strong or weak anion exchange resin beads in mineral forms (e.g., chloride) may be used. In some embodiments, the anion exchange beads can be functionalized with strong base groups such as trimethylamine ionic form or other similar groups familiar to those skilled in the pertinent arts.

In some embodiments, the ion exchange matrix includes a mixture (e.g., cation and anion exchange beads mixed in step 108 to form the ion exchange matrix) of cation and anion exchange beads (e.g., at least about 1 percent by volume of both of the cation and anion exchange bead types). Such a mixed ion bed of beads can advantageously remove both anionic and cationic noxious constituents (e.g., remove both sulfites and histamines). In some embodiments, for instance, the ion exchange matrix includes a mixture of strong cation and strong anion exchange resin beads. In some embodiments, such mixed resin beds can be particularly advantageous at substantially maintaining the pH of the beverage at its pretreated value. This can be an important aspect of retaining the flavor and stability profile of certain desirable components in certain beverages, such as wine. For instance, in some embodiments, the pH of the treated beverage is within about ±1, and in some cases, within ±0.5 pH units of the beverage's pretreatment pH. In some embodiments, to facilitate efficient removal of both anionic and cationic noxious constituents, the ion exchange matrix includes a higher proportion of the anion exchange beads than the cation exchange beads. For example, in some embodiments, the cation exchange beads occupy from about 25 to about 40 percent of a total bead volume of the ion exchange matrix and the anion exchange beads occupy a balance of the total bead volume of the ion exchange matrix (e.g., 75 to 60 percent, respectively). For example, in some embodiments, the cation exchange beads occupy from about 5 to about 25 percent of a total bead volume of the ion exchange matrix and the anion exchange beads occupy a balance of the total bead volume of the ion exchange matrix.

In some embodiments to facilitate efficient removal of different of cationic noxious constituents the ion exchange matrix can include a mixture of cation exchange beads that are in a hydrogen form and cation exchange beads that are in a cationic mineral form (e.g., one or more of the potassium, calcium, magnesium, iron or copper mineral forms). In some embodiments, to facilitate efficient removal of anionic noxious constituents the ion exchange matrix can include a mixture of anion exchange beads that are in a hydroxide form and anion exchange beads that are in one or one of the mineral forms (e.g., a chloride mineral form). In embodiments with a mixture of both cation exchange beads and anion exchange beads to facilitate efficient removal of a broad range of different cationic and anionic noxious constituents the ion exchange matrix cation exchange beads in a hydrogen form, cation exchange beads in a cationic mineral form, anion exchange beads in a hydroxide form and anion exchange beads in a mineral form.

In some embodiments, the mixed ion exchange matrix can include sulfonated copolymer of styrene and divinylbenzene functionalized resins beads in the hydrogen form (e.g., each bead type in a range from about 20 to about 30 percent of the total bead volume) and dimethylaminoethanol functionalized, chloromethylated copolymer of divinylbenzene and styrene functionalized resins beads in the hydroxide form (each bead type in a range from about 15 to 30 percent of the of the total bead volume). Non-limiting commercially available ion exchange matrix include TM-9 family, including TM-9, TM-9SG and TM-9XRR mixed exchange resins beads (Siemens Industry, Inc. Rockford, Ill.).

In some embodiments, to promote efficient ion exchange and still have a high rate flow rates of the beverage through a bed of the ion exchange matrix 210, the ion exchange matrix 210 have an average diameter in a range of 50 to 500 microns, and in some cases, an average diameter in a range of from 200 to 300 microns.

In some embodiments the method 100 can alternatively, or in some cases additionally, include a step to treat the beverage to reduce the negative symptoms without removing the noxious constituents. For instance, in some embodiments, the method 100 includes a step 120 of adding one or more anti-allergenic ingredients to the beverage. In some embodiments, the step 120 of adding an anti-allergenic ingredient can be used in combination with the step 105 exposing the beverage to ion exchange matrix to provide additional reduction of allergy like reactions. In some cases, the anti-allergenic ingredients can be initially bound to the ion exchange resin (e.g., as added in optional step 125) and then the anti-allergenic ingredient exchanges with the noxious constituents during the treatment step 105 to thereby be released into the beverage.

Non-limiting examples of anti-allergenic ingredients include anti-histamines and vasoconstrictors. In some embodiments, the anti-allergenic ingredient can include one or more homeopathic ingredients such as ephedra, caffeine (coffee or guarana), quercetin, grape seed extract, pine bark extract, and/or butterbur.

Figure 2A:
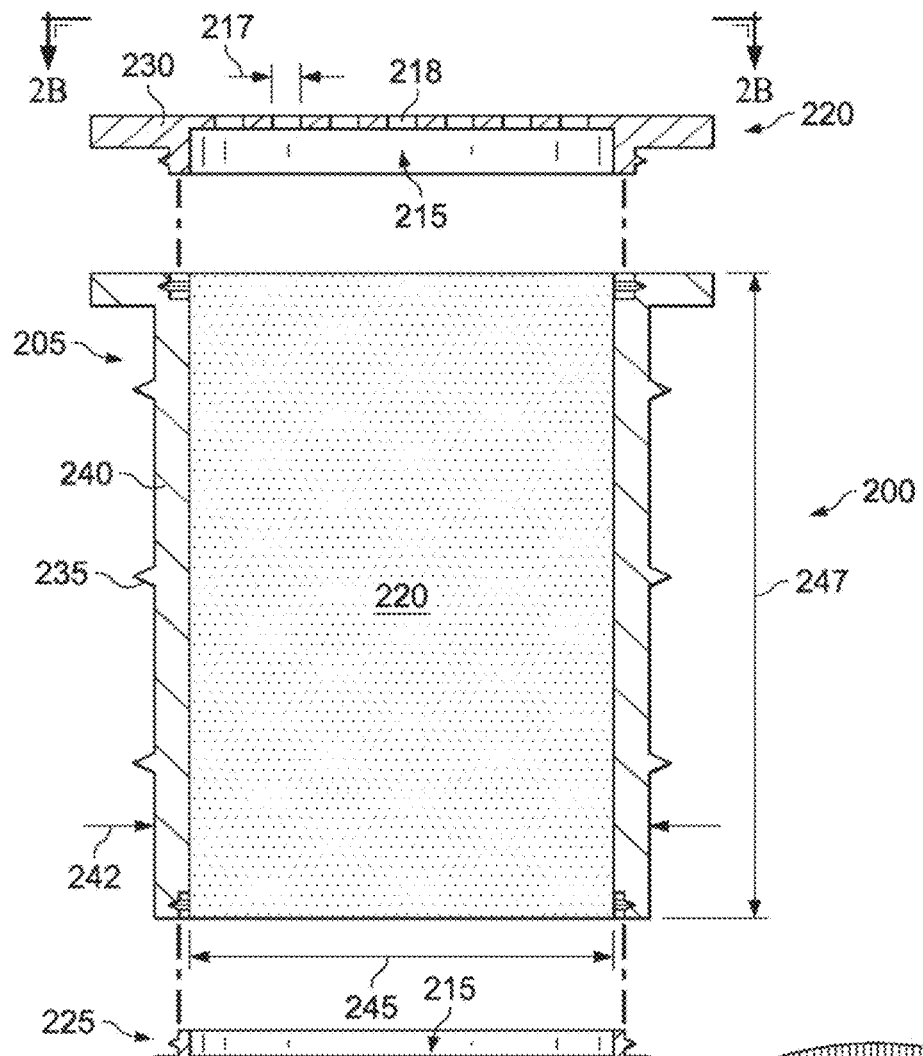
FIG. 2A presents a cross-sectional view of an example apparatus the present disclosure for treating a beverage.
Figure 2B:
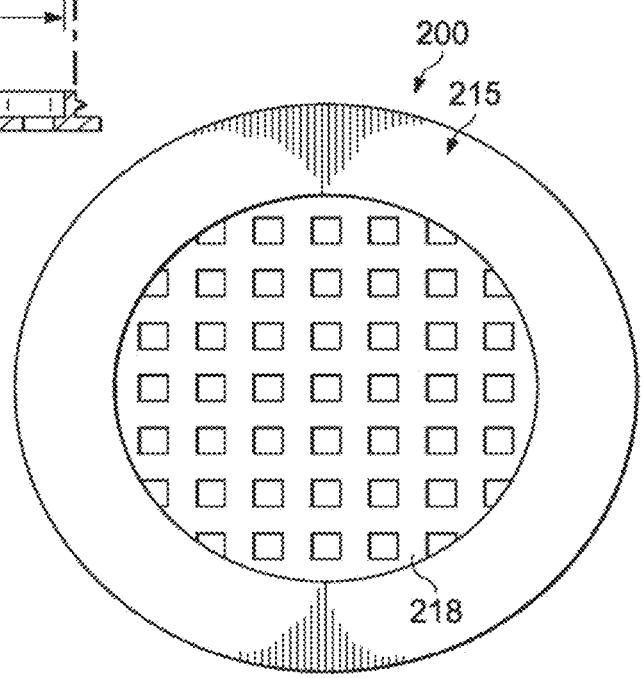
FIG. 2B present a plan view of the example apparatus depicted in FIG. 2A along view line 2B-2B.
Figure 3:
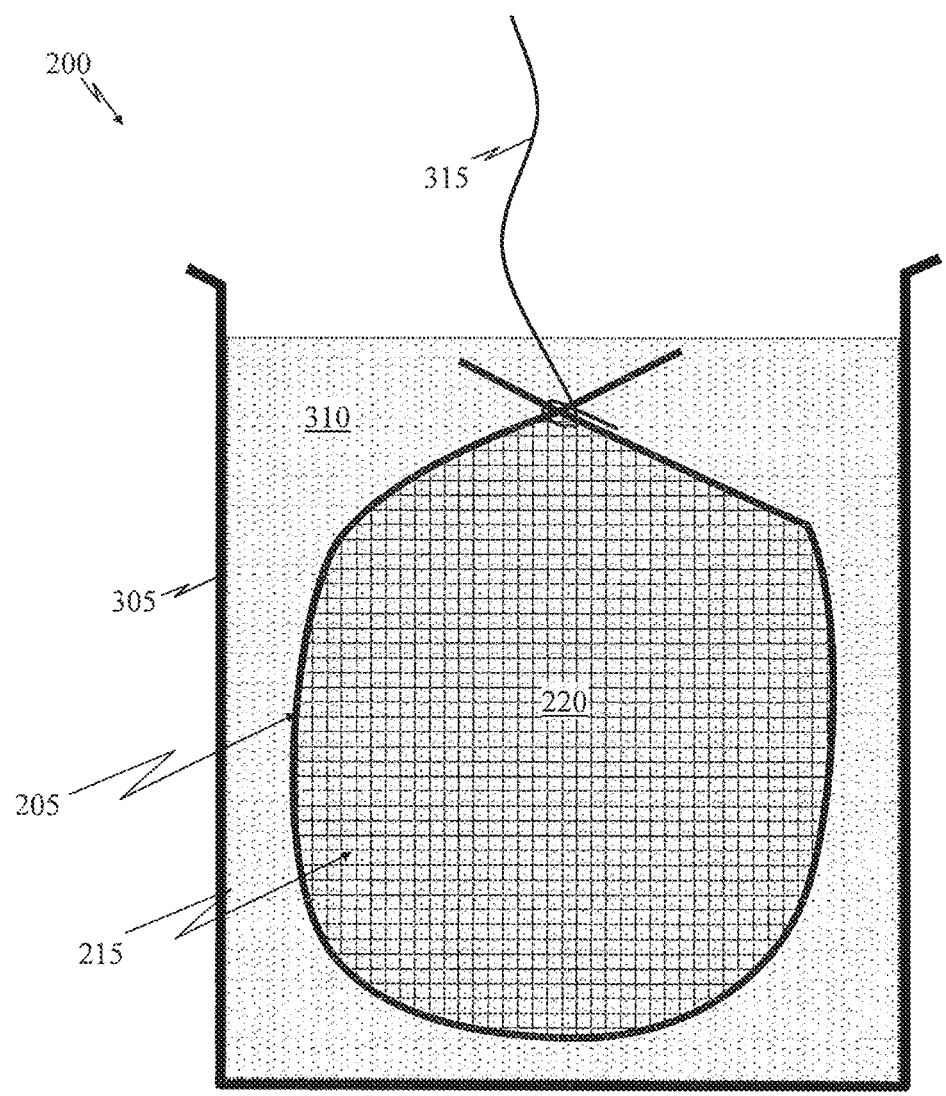
FIG. 3 presents a cross-sectional view of another example apparatus the present disclosure for treating a beverage.

Another embodiment is an apparatus for treating beverages. FIG. 2A presents a cross-sectional view of an example apparatus 200 the present disclosure for treating a beverage. FIG. 2B present a plan view of the example apparatus depicted in FIG. 2A along view line 2B-2B. FIG. 3 presents a cross-sectional view of another example apparatus 200 the present disclosure for treating a beverage.

As illustrated in FIGS. 2 and 3, the apparatus 200 comprises a container 205 that holds ion exchange matrix 210 therein. At least part of the container 205 includes a screen 215 that prevents the passage of ion exchange matrix 210 there-through and permits the passage of a beverage (e.g., beverage 310, FIG. 2) there-through.

The ionic exchange beads 210 can be any of the embodiments of the anion, cation, or mixed cation and ion bed resins disclosed herein to reduce to concentration of one or more cationic or anionic noxious constituents from the beverage.

In some embodiments the container 205 can further hold one or more anti-allergenic ingredients, such as any of the ingredients discussed herein.

Embodiments of the screen 215 can have a mesh size that prevents substantial quantities of the ionic exchange beads 210 from passing through the screen 215, but still allows rapid flow of the beverage through the container 205. For instance, in some embodiments, the screen 215 can have a mesh size of about 16, and in some cases, about 20, and some cases, about 50, and in some cases, about 100, and in some cases, about 200. For instance, in some embodiments, the size 217 of openings 218 (e.g., diameter or separation distance) in the screen 215 are about 0.025 mm, and in some cases, about 0.010 mm, and in some cases, about 0.05 mm.

Embodiments of the screen 215 can be composed of metals or metal alloys, such as aluminum or steel, plastics, ceramics, synthetic or natural fabrics, or other materials familiar to those skilled in the pertinent arts.

Embodiments of the apparatus 200 are versatile and can be utilized in many different modalities such as bottles, glasses, carafes decanters and aeration devices.

For instance, as illustrated in FIG. 2, the apparatus 200 can have a container 205 configured as a cartridge. The screen 215 can include first and second screens 215 on the input end 220 and output end 225 of the cartridge container 205, respectively.

In some embodiments, the cartridge container 205 can be configured to fit into the neck of a storage bottle holding a beverage, e.g., a wine bottle. In some embodiments, as the beverage is poured out of the bottle through the cartridge container 205 into a dispensing container, such as a glass, decanter or carafe. In other embodiments, the beverage can be poured from a bottle into a dispensing container, e.g., a glass or carafe, through the cartridge container 205 configured to fit into the opening of the dispensing container (e.g., the neck of a glass or carafe). In other embodiments, the cartridge container 205 can be part of or incorporated into an aeration device.

In some embodiments, the cartridge container 205 include an input cap 230 and output cap 232 (e.g., a detachable cap) that can hold the screen 215 (or a replacement screen 215 in some embodiments). In some embodiments, the cartridge container 205 includes ribs 235 (e.g., flexible ribs) that protrude (e.g., about 1 mm) from the cartridge wall 240 to facilitate a liquid tight seal with the neck of the storage bottle or dispensing container that the cartridge container 205 is configured to fit into. In some embodiments, the cartridge wall 240 is cylindrically shaped and has an outer diameter 242 of about 17 mm and inner diameter 245 of about 15 mm. In some embodiments the cartridge container 205 has a long axis length 247 of about 60 mm.

For instance, as illustrated in FIG. 3, the apparatus 200 can have a container 205 configured as a bag (e.g., satchel). In such embodiments all or a substantial portion (e.g., about 10 percent or more or about 50 percent or more of the bag container 205, wall 240 can include the screen 215. All or a portion of the apparatus 300 can be submerged into a container 305 (e.g., storage bottle or dispensing container) holding the beverage 310. In some embodiments, the bag container 205 can further include a string 315 to facilitate recovery of the apparatus out of the container 305.

Another embodiment is a beverage, such as wine or any of the other identified beverages. The beverage is substantially free of noxious constituents. The beverage is treated by any one or more of the embodiments of the method 100, and/or, using one or more embodiments of the apparatus 200 discussed in the context of FIGS. 1-3.

For example in some embodiments the beverage comprises or is a treated volume of a liquid alcoholic beverage (e.g., wines, beers or spirits) that has been exposed to an ion exchange matrix that includes a mixture of cation exchange beads and anion exchange beads capable of binding one or more noxious ionic constituents present in the beverage. The noxious ionic constituents (e.g., one or both of sulfites or histamine) can be reduced by at least about 25 percent compared to an untreated volume of the beverage.

The noxious constituents include total sulfite concentrations of about 300 ppm or less, and/or, total histamine concentrations of about 30 ppm or less. In some embodiments, sulfite concentrations are about 300 ppm or less and total histamine concentration is about of about 30 ppm or less. In some embodiments of the beverage have a total sulfite concentrations of about 50 ppm or less and/or histamine concentration of about 10 ppm or less. In some embodiments of the treated alcoholic beverage, the noxious constituents additionally or alternatively include a total tyramine concentration of about 10 ppm or less. In some embodiments of the treated alcoholic beverage, the noxious constituents additionally or alternatively include a total tannins concentration of about 2000 ppm or less.

Some embodiments of the treated beverage, alternatively, or in some cases additionally, include one or more anti-allergenic ingredients including anti-histamines and/or vasoconstrictors. In some embodiments, the anti-allergenic ingredient can include ephedra in a concentration of about 100 ppm or higher. In some embodiments, the anti-allergenic ingredient can include caffeine in a concentration of about 400 ppm or higher. In some embodiments, the anti-allergenic ingredient can include quercetin in a concentration of about 500 ppm or higher. In some embodiments, the anti-allergenic ingredient can include resveratrol in a concentration of about 500 ppm or higher. In some embodiments, the anti-allergenic ingredient can include grape seed extract in a concentration of about 250 ppm or higher. In some embodiments, the anti-allergenic ingredient can include pine bark extract in a concentration of about 150 ppm. In some embodiments, the anti-allergenic ingredient can include grape butterbur in a concentration of about 100 ppm or higher.

To further illustrate various features of the disclosed method, apparatus and/or beverage, several non-limiting example treatment procedures are presented below.

Experiment 1

Red Wine (Wolf Blass Yellow Label Cabernet Sauvignon, Australia) was used as purchased. Once the bottle was opened, wine was distributed into three 200 mL glass bottles and sealed stored in fridge. A 0.02% Potassium Metabisulfite ($K_2S_2O_5$) solution used in this experiment was prepared with $K_2S_2O_5$ salt (Sigma-Aldrich) and DI water in a volumetric flask.

Ion Exchange Experiments: In these experiments, desired amounts of Ion exchange beads (TM-9XRR, Mix Bed, H/OH) were added to 35 mL of red wine or 50 mL of 0.02% $K_2S_2O_5$ solutions with magnetic stirring. Typically, after 10 min of mixing, 25 mL of supernatant (without beads) was carefully moved to a 50 mL beaker for $SO_2$ titration.

Free $SO_2$ Titration: 25 mL of sample was first placed in a beaker for titration with medium-speed stirring. Then 2 mL of 2N HCl and 2 mL of reactant solution were added to the beaker. $SO_2$ Electrode (SC-300, Vinmetrica, Calif., USA) was turned on and immersed in solution. The mixture solution was titrated with standard $SO_2$ titrant provided by Vinmetrica. The volume of titrant consumed was measured and used to calculate the free $SO_2$ in sample.

Total $SO_2$ Titration: 25 mL of sample was first placed in a beaker for titration with medium speed stifling. 10 mL of 1N NaOH was added to the beaker and stirred for 10 min. Then 8 mL of 2N HCl and 2 mL of reactant solution were mixed with the analyte. The analyte was titrated with titrant same as free $SO_2$ titration. The volume of titrant consumed was measured and used to calculate the free $SO_2$ in sample.

Free $SO_2$ and total $SO_2$ of red wine are shown in TABLE 1. Wine is acidic and the free $SO_2$ value decreases with time once the bottle is opened. The repeat measurement result indicates that the titration result is relatively accurate.

Figure 4:
FIG. 4 presents free $SO_2$ results of wine treated with ion exchange matrix as disclosed in Experiment 1.

The free $SO_2$ results of wine treated with ion exchange beads are plotted in the FIG. 4. Mixing with ion exchange beads can lower the free $SO_2$ value in wine samples. The estimated ion exchange capacity for wine sample is about 0.13 mg $SO_2$/g beads.

TABLE 1

| Sample | pH | Free $SO_2$ (ppm) | Total $SO_2$ (ppm) |
|---|---|---|---|
| Day 1 | 3.88 | 29 | |
| Day 5 | 3.63 | 22 | 50 |
| Day 5 (repeat) | | 22 | |

The free $SO_2$ results of wine treated with ion exchange beads are plotted in FIG. 4. Mixing with ion exchange beads can lower the free $SO_2$ value in wine samples. The estimated ion exchange capacity for wine sample is about 0.14 mg $SO_2$/g beads.

Figure 5:
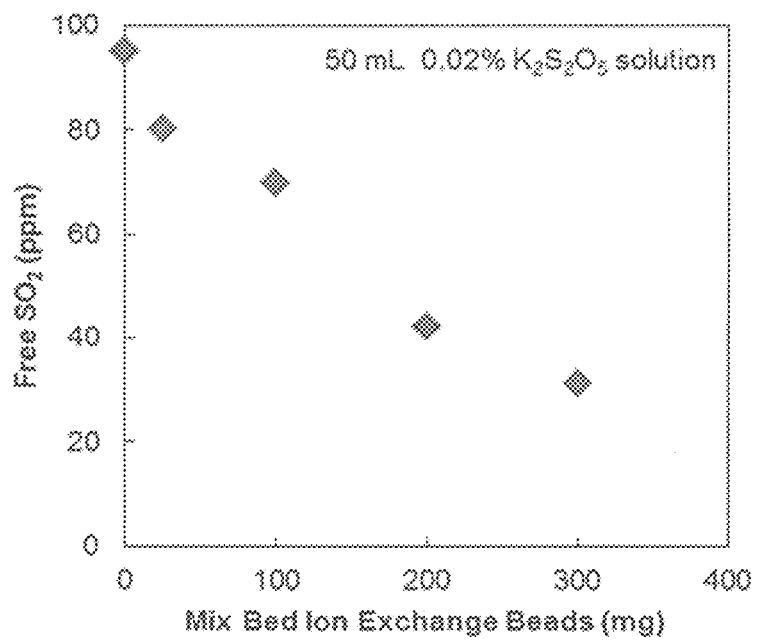
FIG. 5 presents results of employing a 0.02% $K_2S_2O_5$ solution as a sulphite solution to evaluate the beads capacity towards sulphite as disclosed in Experiment 1.

A 0.02% $K_2S_2O_5$ solution was employed as a sulphite solution to evaluate the beads capacity towards sulphite. The results are shown in FIG. 5. The free $SO_2$ of solution decrease with the increase of beads added to the solution. The estimated ion exchange capacity in 0.02% $K_2S_2O_5$ solution is about 10.4 mg $SO_2$/g beads which is 100 times higher than that in wine sample. Thus it is suspected that there are a lot of competing ions binding to ion exchange beads.

The results suggest that the free $SO_2$ in wine can be removed by mix bed ion exchange beads. In some cases, the capacity of beads binding to sulphite in wine can be lower than that in sulphite solution, possibly due to other ions present in wine binding to beads with sulphite ions. In some cases, the reproducibility of $SO_2$ titration is about ±2 ppm error.

Experiment 2

Red Wine (Wolf Blass Yellow Label Cabernet Sauvignon, Australia) was used as purchased. Once the bottle was opened, wine was distributed into three 200 mL glass bottles and sealed stored in fridge.

Ion Exchange Experiments: Several methods has been used to mix ion exchange resin with wine sample, including Stir, Flowing through (funnel, column), Non-stir and Satchel Packed.

Stirred: 5 g Ion exchange beads (TM-9XRR, Mix Bed, H/OH) were added to 100 mL of red wine with magnetic stirring. After desired time of stirring, 25 mL of supernatant (without beads) was carefully moved to a 50 mL beaker for $SO_2$ titration.

Non-stirred: 5 g ion exchange beads were added to 100 ml of red wine without stirring. After 10 min, 25 mL of supernatant was taken for $SO_2$ content titration.

Flowing through Funnel: 5 g of Ion exchange beads were first placed on a filter funnel (with whatman No. 1 filter paper). Then 100 mL of wine were carefully poured over the beads and let it slowly drain down through beads and filter paper. Filtrate was collected for further $SO_2$ content tests. Recycle experiments were performed by using those used beads without washing.

Flowing through Column: 6 g of Ion exchange beads were first packed in a small chromatograph column. 100 mL of wine was added to the top of the column and flowed through the column. Recycle experiments were performed by using the same used beads in column without washing.

Stachel Packed: 5 g of ion exchange beads were first placed in a tea satchel. Tea bags were stapled at the top to avoid any loss of beads. Then tea satchel was immerged in 100 mL of wine for a desired time.

Free $SO_2$ Titration: 25 mL of sample was first placed in a beaker for titration with medium-speed stirring. Then 2 mL of 2N HCl and 2 mL of reactant solution were added to the beaker. $SO_2$ Electrode was turned on and immersed in solution. The mixture solution was titrated with standard $SO_2$ titrant provided by Vinmetrica. The volume of titrant consumed was measured and used to calculate the free $SO_2$ in sample.

Total $SO_2$ Titration: 25 mL of sample was first placed in a beaker for titration with medium speed stifling. 10 mL of 1N NaOH was added to the beaker and stirred for 10 min. Then 8 mL of 2N HCl and 2 mL of reactant solution were mixed with the analyte. The analyte was titrated with titrant same as free $SO_2$ titration. The volume of titrant consumed was measured and used to calculate the free $SO_2$ in sample.

Figure 6:
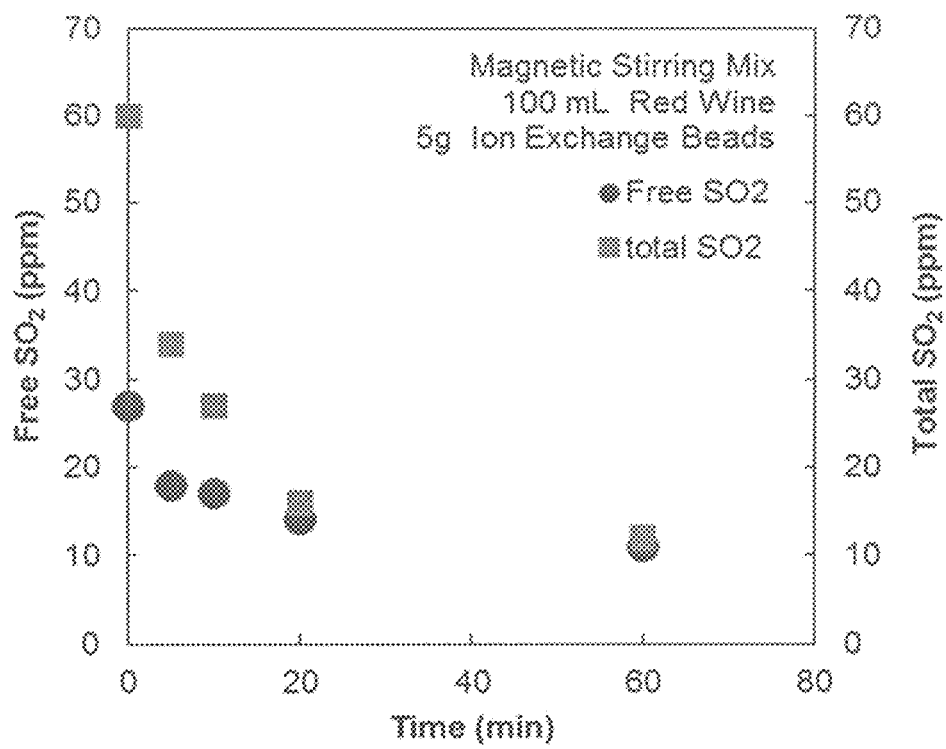
FIG. 6 presents results of examining the influence of stirring time on $SO_2$ content as disclosed in Experiment 2.

The effect of stirring time on $SO_2$ content: The influence of stirring time on $SO_2$ content is shown in FIG. 6. Both free $SO_2$ and total $SO_2$ content dramatically decline from 60 to 15 ppm at the first 20 min of mixing. About 20 min is required to reach the equilibrium level.

Figure 7:
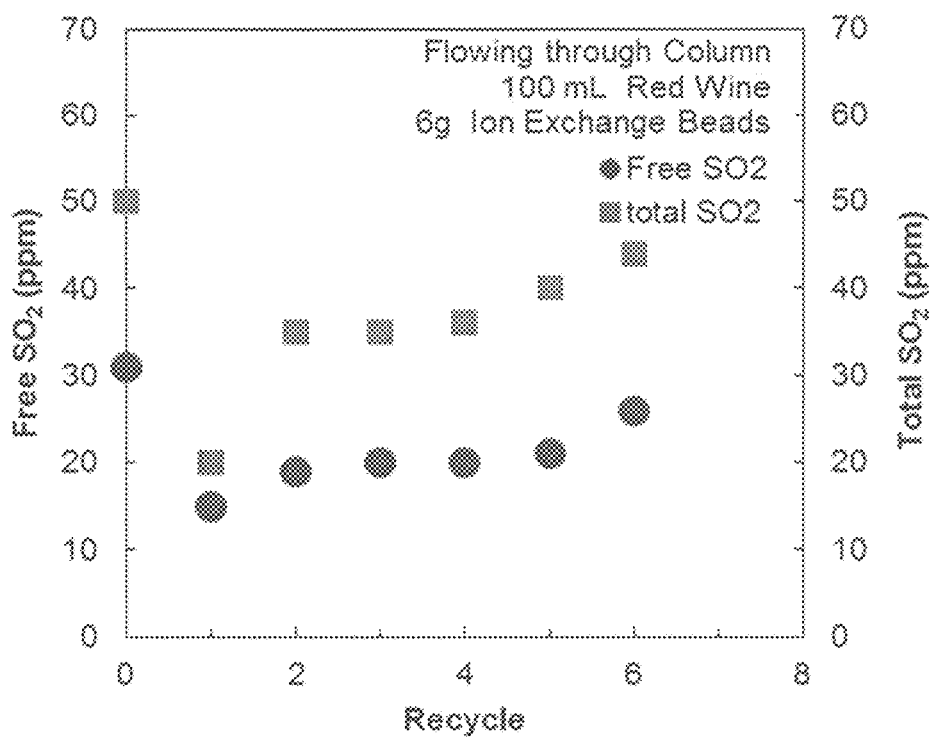
FIG. 7 presents results of examining the removal of $SO_2$ by flowing through a column as disclosed in Experiment 2.

The effect of flowing through filter funnel and chromatograph column: FIG. 7 shows the removal of $SO_2$ by flowing through a column. In the first cycle, about 60% of $SO_2$ can be removed by the ion exchange beads in the column. The total $SO_2$ drops from 50 to 20 ppm. In addition, the used beads in column still show the ability to remove $SO_2$ in wine after the first cycle. After 4 times recycling, the beads still are able to remove about 30% of $SO_2$ in wine. Flowing through a funnel method shows similar results as flowing through the column. However, it takes longer time for 100 mL of wine to flow through filter funnel (20 min) compared with the column (13 min). The filter material property might be the factor reducing the flow rate.

Figure 8:
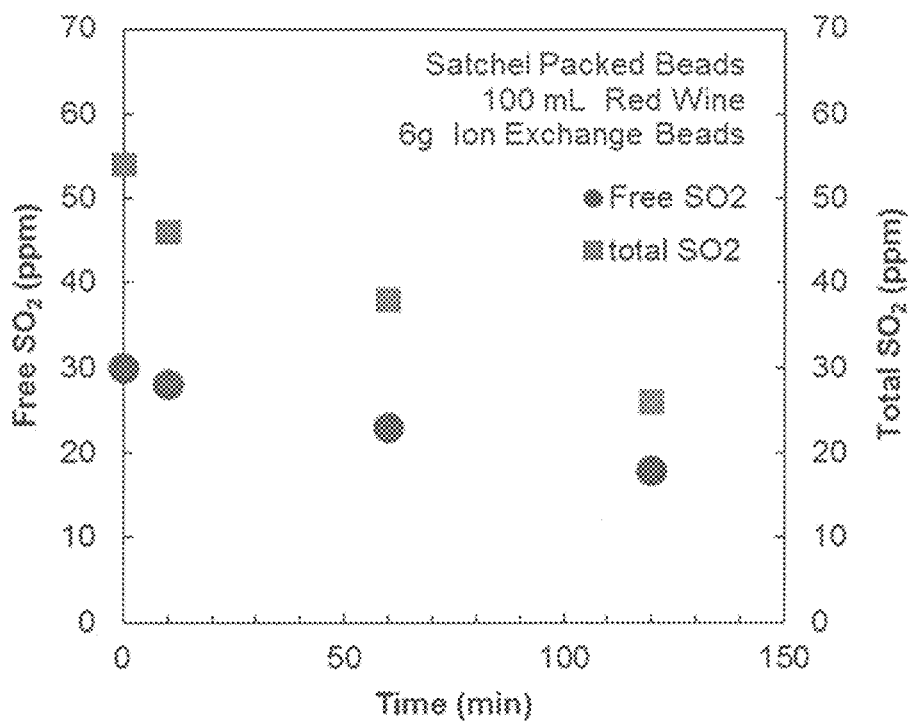
FIG. 8 presents results of removal of $SO_2$ in wine by satchel packed with ion exchange matrix with various soaking time as disclosed in Experiment 2.

The effect of removal of $SO_2$ by a satchel pack: FIG. 8 presents the removal of $SO_2$ in wine by satchel packed beads with various soaking time. Both free $SO_2$ and total $SO_2$ slightly decrease with 10 min treatment. However, this process is very slow. The $SO_2$ content still remains a high level even after 1 hour of soaking.

Figure 9:
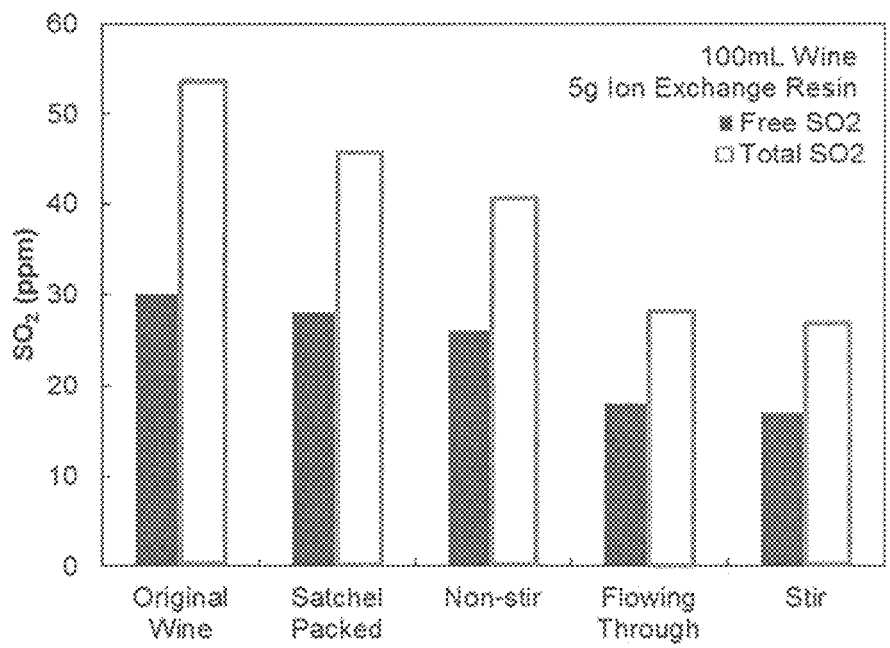
FIG. 9 presents results of removal of free $SO_2$ and total $SO_2$ contents of untreated wine and wine treated by four different methods as disclosed in Experiment 2.

Comparison of $SO_2$ removal methods: The free $SO_2$ and total $SO_2$ contents of wine treated by four different methods are shown in the FIG. 9. Satchel Packed method and Non-stir method can only remove lesser amount of $SO_2$ in wine. However, flow through method and stir method can remove about 50% of total $SO_2$ content from 54 to 28 ppm. In addition, according to the $SO_2$ content, there was a small difference between flow through method and stir method. Non-stir method works slightly better than satchel packed method. This may due to the outer layer of satchel textile, which forms a barrier to mass transfer. Comparing those methods, it can be observed that fluidic flow helps the removal of $SO_2$ to a large extent by transporting ions close to ion exchange beads. However, the flow rate of wine flowing through the column is slower (7.69 mL/min) compared with pouring (approximately 1000 mL/min).

The results suggest that $SO_2$ in wine can be efficiently removed by mixing ion exchange beads with wine with stirring. In some cases, about 20 min is required to reach the final equilibrium level. In some cases, compared with a stir method, the efficiency of beads to remove $SO_2$ will be lower when packing beads in a satchel or simply soaking beads in wine without stirring. In some cases, flow through shows similar result to stirring. It may indicate that the fluidic flow of wine through ion exchange beads is an important variable affecting the speed of $SO_2$ removal. In some cases, ion exchange beads packed in column can be recycling for repeated use.

Experiment 3

$SO_2$ removal from wine using ion exchange resin beads A-244 XRR (Cl) (hence forth "Cl anion exchange resin") were tested on wine samples with the same method as described in experiments 1 and 2. The results are compared with the results using the TM-9 XRR (H/OH mix bed; henceforth "mixed H/OH ion exchange resin") ion exchange resin beads, such as described in experiments 1 and 2.

Figure 10A:
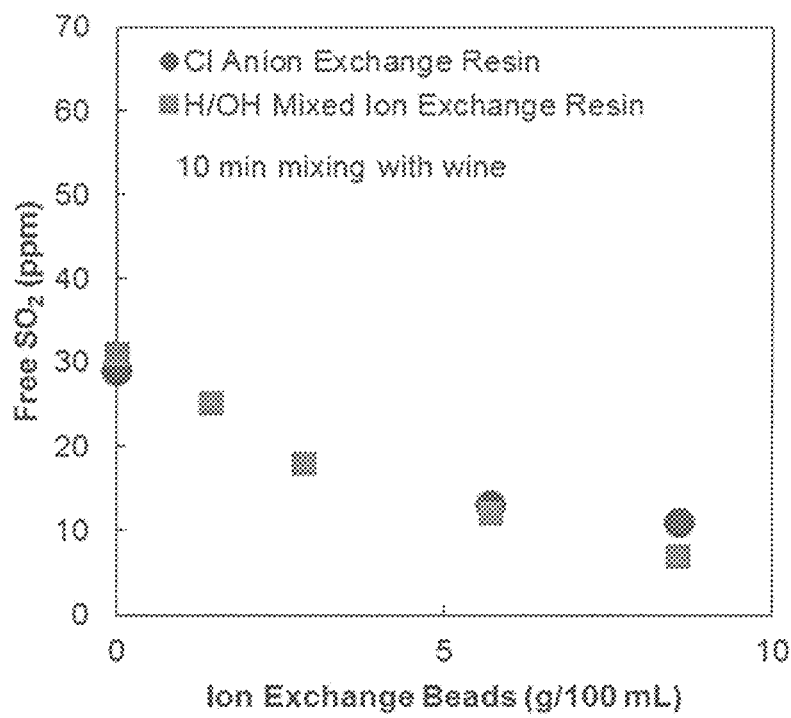
FIGS. 10A and 10B present results of removal of free $SO_2$ from wine Cl anion exchange resin beads and H/OH mixed ion exchange resin beads with stirring using different resin bead amounts, as disclosed in Experiment 3.
Figure 10B:
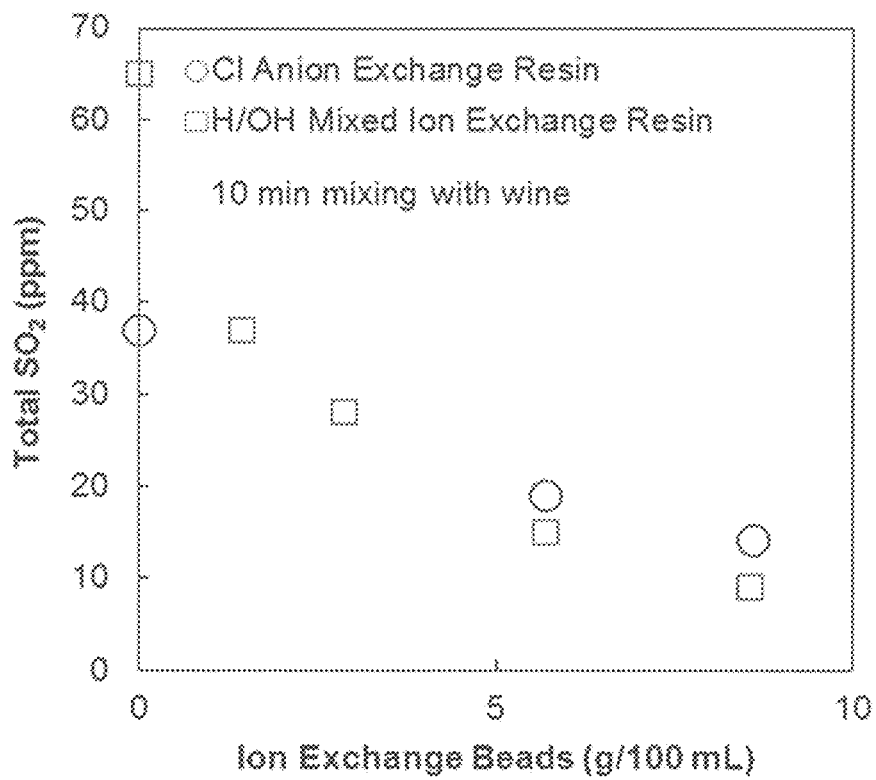

Wine was treated with anion (Cl) exchange resins for 10 min with medium stirring. Result of $SO_2$ removal are presented in FIGS. 10A and 10B using different resin amounts. The Cl Anion exchange resin shows similar ability as the mixed H/OH ion exchange resin to remove both the free $SO_2$ and total $SO_2$ in wine.

Tables 2 and 3 show properties of wine treated by the Cl anion exchange resin and the mixed H/OH ion exchange resin, respectively.

TABLE 2

| Sample | Ion exchange beads (g/100 mL) | Time (min) | pH | Conductivity (μS/cm) | Free SO2 (ppm) | Total SO2 (ppm) |
|---|---|---|---|---|---|---|
| Wine | 0 | 0 | 3.71 | 2500 | 29 | 37 |
| Wine | 5.7 | 10 | 3.32 | 3260 | 13 | 19 |
| Wine | 8.6 | 10 | 3.35 | 3720 | 11 | 14 |

TABLE 3

| Sample | Ion exchange beads (g/100 mL) | Time (min) | pH | Conductivity (μS/cm) | Free SO2 (ppm) | Total SO2 (ppm) |
|---|---|---|---|---|---|---|
| Wine | 0 | 0 | 3.58 | 2460 | 31 | 65 |
| Wine | 1.4 | 10 | 3.49 | 1750 | 25 | 37 |
| Wine | 2.9 | 10 | 3.38 | 1360 | 18 | 28 |
| Wine | 5.7 | 10 | 3.12 | 565 | 12 | 15 |
| Wine | 8.6 | 10 | 3.02 | 333 | 7 | 9 |

The conductivity of wine treated with the Cl anion exchange resin was increased from 2.5 mS/cm to 3.7 mS/cm (Table 2). The conductivity of wine treated with the H/OH mixed bed resin decreased to 0.3 mS/cm (Table 3). Possible reasons for this difference may be the introduction of Cl anions by ion exchange. The pH of wine treated with the Cl anion exchange resin decreased from 3.71 to 3.35 (Table 2). The pH of wine treated with the H/OH mixed bed resin decreased from 3.58 to 3.02 (Table 3).

The result suggest that the Cl anion exchange resin removes $SO_2$ from wine, with the same to slightly lower rates of removal as compared to the H/OH mixed bed resin. The conductivity of wine increases after treatment with the Cl anion exchange resin.

Experiment 4

The free $SO_2$, total $SO_2$, pH and conductivity of wine before and after ion exchange resin were measured and compared.

$SO_2$ titrant and Reactant were purchased from Vinmetrica. Red Wine (Wolf Blass Yellow Label Cabernet Sauvignon, Australia) was used as purchased. Once the bottle was opened, wine was distributed into three 200 mL glass bottles and sealed stored in fridge. Potassium Metabisulfite (0.02% $K_2S_2O_5$) solution used in this experiment was prepared with $K_2S_2O_5$ salt (Sigma-Aldrich) and DI water in a volumetric flask. Mixed bed ion exchange resin (TM-9 XRR (H/OH)), Anionic ion exchange resins (A-244 XRR(Cl), A-464 (Cl)) and Cationic ion exchange resin (C-211 XRR (H)) were used as received from SIEMENS. A chromatography column (10 mm diameter×135 mm height) was packed to a bead height of about 80 mm and the wine height above resins equaled about 50 mm.

$SO_2$ Content Measurement:

Free $SO_2$ Titration: 25 mL of sample was first placed in a beaker for titration with medium-speed stirring. Then 2 mL of 2N HCl and 2 mL of reactant solution were added to the beaker. $SO_2$ Electrode was turned on and immersed in solution. The mixture solution was titrated with standard $SO_2$ titrant provided by Vinmetrica. The volume of titrant consumed was measured and used to calculate the free $SO_2$ in sample.

Total $SO_2$ Titration: 25 mL of sample was first placed in a beaker for titration with medium speed stifling. 10 mL of 1N NaOH was added to the beaker and stirred for 10 min. Then 8 mL of 2N HCl and 2 mL of reactant solution were mixed with the analyte. The analyte was titrated with titrant same as free $SO_2$ titration. The volume of titrant consumed was measured and used to calculate the free $SO_2$ in sample.

Ion Exchange Experiments:

Stirring Method: In a typical experiment, 5 g of ion exchange resin was added to 100 mL of wine with magnetic stirring. After 10 min of mixing, 25 mL of supernatant (without beads) was carefully moved to a 50 mL beaker for $SO_2$ titration.

Non-Stirring Method: In these experiments, 5 g ion exchange beads were added to 100 ml of wine without stirring. After 10 min, 25 mL of supernatant was taken for $SO_2$ content titration.

Flowing through (Funnel) Method: 5 g of Ion Exchange beads were first placed on a filter funnel (with whatman No. 1 filter paper). Then 100 mL of wine were carefully poured over the beads and let it slowly drain down through beads and filter paper. Filtrate was collected for further $SO_2$ content tests. Recycle experiment were performed by using those used beads without washing.

Flowing through (Column) Method: 6 g of Ion exchange beads were first packed in a small chromatography column. 100 mL of wine was added to the top of the column and flowed through the column. Recycle experiments were performed by using the same used beads in column without washing.

Satchel Packed Method: In this method, 5 g of ion exchange beads were first placed in a tea satchel (95×70 mm). Tea bags were folded at the top to avoid any leaking. Then tea satchel was immerged in 100 mL of wine for a desired time.

Wine Properties:

The initial wine properties of 7 bottles of wine were measured and shown in Table 4. The measurements were conducted right after bottles were opened. According to the results shown in Table 4, the conductivity and total $SO_2$ values vary with bottles, while the pH and free $SO_2$ values are less variable. The pH and free $SO_2$ value are two important quality control parameters for the purpose of protecting the wine during wine making process. pH and free $SO_2$ are adjusted by adding sulphuric acid and sulphite depending on each fermentation batch. Thus, the conductivity and total $SO_2$ of each batch of wine vary with the fermentation condition.

TABLE 4

| Bottle | Conductivity (µS/cm) | pH | Free $SO_2$ (ppm) | Total $SO_2$ (ppm) |
|---|---|---|---|---|
| 1 |  | 3.88 | 29 | 50 |
| 2 | 2460 | 3.58 | 31 | 65 |
| 3 | 3860 | 3.68 | 27 | 60 |
| 4 | 2440 | 3.62 | 31 | 48.5 |
| 5 | 2320 | 3.68 | 30 | 54 |
| 6 | 3710 | 2.5 | 29 | 46 |
| 7 | 3560 | 2.49 | 29 | 51 |

Wine will contact with oxygen and be oxidized once opened. The properties of wine after opening with time were recorded (Table 5). The initial wine property is shown as Day 1 sample, which was freshly opened wine. Wine is acidic and the free $SO_2$ value decreases quickly with time once the bottle is opened. However, the total $SO_2$ value shows a slow drop from 64 to 60 in three days.

TABLE 5

| Sample | Conductivity (µS/cm) | pH | Free SO2 (ppm) | Total SO2 (ppm) |
|---|---|---|---|---|
| Day 1 | 2460 | 3.58 | 31 | 65 |
| Day 2 | 1660 | 3.61 | 24 | 64 |
| Day 3 | 1570 | 3.77 | 24 | 60 |
| Day 5 | 1650 | 3.63 | 22 | 50 |
| Day 12 | 1700 | 3.69 | 15 | 49 |

Removal of $SO_2$ by Mixed Bed (H/OH) Ion Exchange Resin:

Wine samples were treated with various amounts of ion exchange resins, for various times, by adding resins into wine sample with magnetic stirring for a desired time to remove the $SO_2$ content from wine. The free $SO_2$, total $SO_2$, pH and conductivity of samples before and after treatment were recorded and plotted. Four types of resins were used.

Stirring Method: The Effect of Resin Amount on $SO_2$ Content.

Figure 11A:
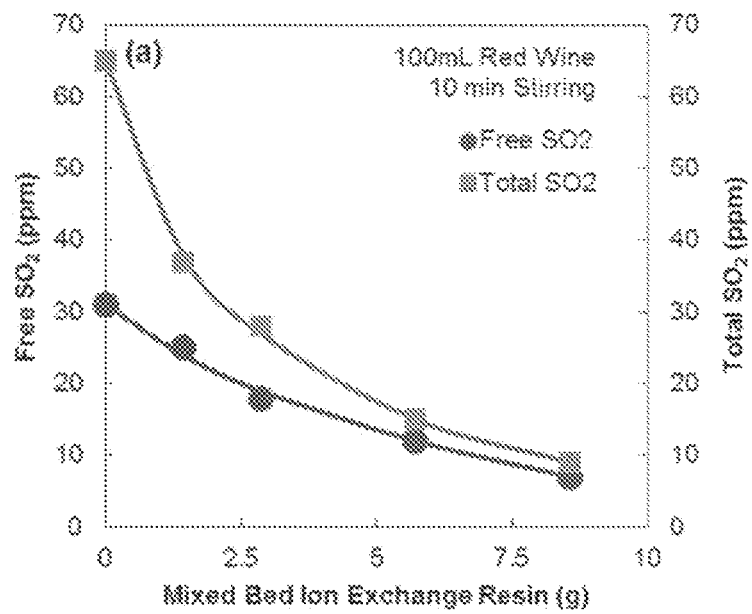
FIGS. 11A and 11B present results showing the influence of ion exchange resins on free and total SO2 contents in wine (a) and conductivity and pH of wine (b), as disclosed in Experiment 4.
Figure 11B:
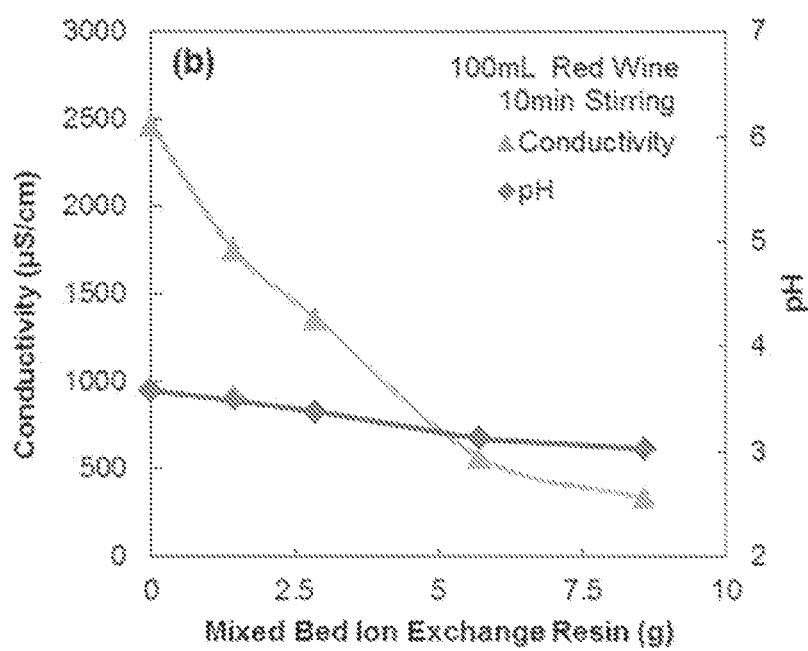

The free $SO_2$ and total $SO_2$ contents of wine treated with mixed bed (H/OH) ion exchange beads are shown in the FIG. 11A. Mixing wine with ion exchange resins can lower both the free and total $SO_2$ content in wine samples. The estimated ion exchange capacity for free $SO_2$ in wine is about 0.14 mg SO2/g resins. However, as to total $SO_2$ contents in wine, it is not linear to the amount of ion exchange resins mixed with wine. When the total $SO_2$ level in solution is low, it requires more ion exchange resins to remove $SO_2$ in wine. The capacity of those resins drops. In addition, the conductivity and pH are shown in FIG. 11B. The conductivity of wine dramatically decreased from 2460 to 300 µS/cm, whereas, the wine pH slightly drops.

Figure 12:
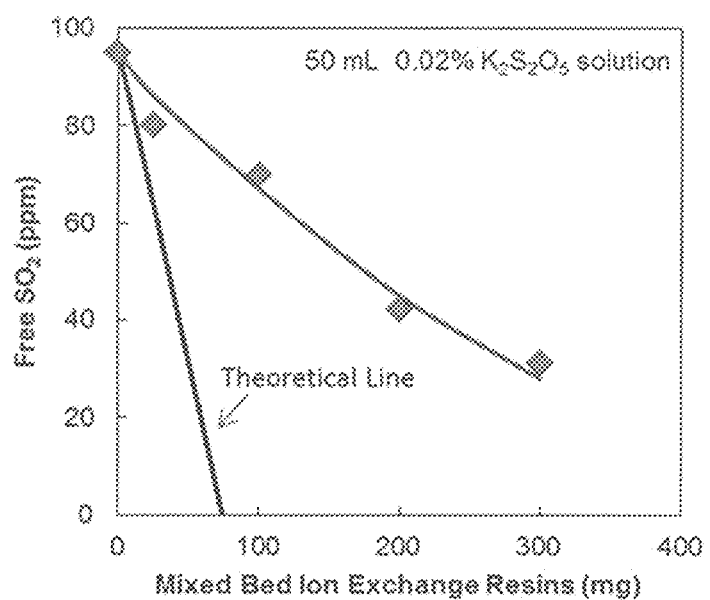
FIG. 12 presents results showing the removal of $SO_2$ in $K2S_2O_5$ solution with mixed bed ion exchange resins, as disclosed in Experiment 4.

$K_2S_2O_5$ solution (0.02%) was employed as an ideal sulphite solution to evaluate the resins capacity towards sulphite. The results are shown in FIG. 12. The free $SO_2$ of solution decrease with the increase of resins added to the solution. The estimated ion exchange capacity in 0.02% $K_2S_2O_5$ solution is about 12.14 mg $SO_2$/g resins which is 100 times higher than that in wine sample.

Stirring Method: The Effect of Mixing Time on $SO_2$ Content.

Figure 13A:
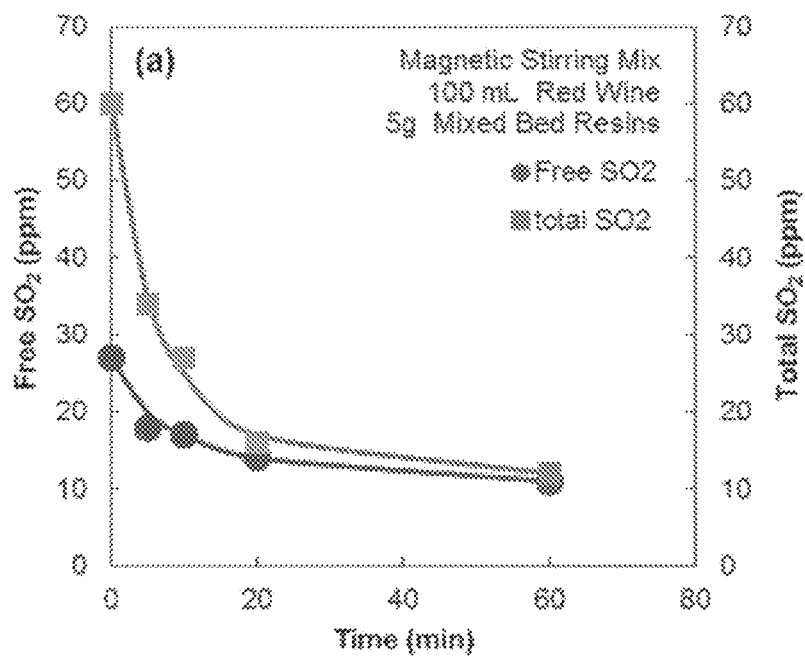
FIGS. 13A and 13B present results showing the effect of mixing time on $SO_2$ content, pH and conductivity of wine, as disclosed in Experiment 4.
Figure 13B:
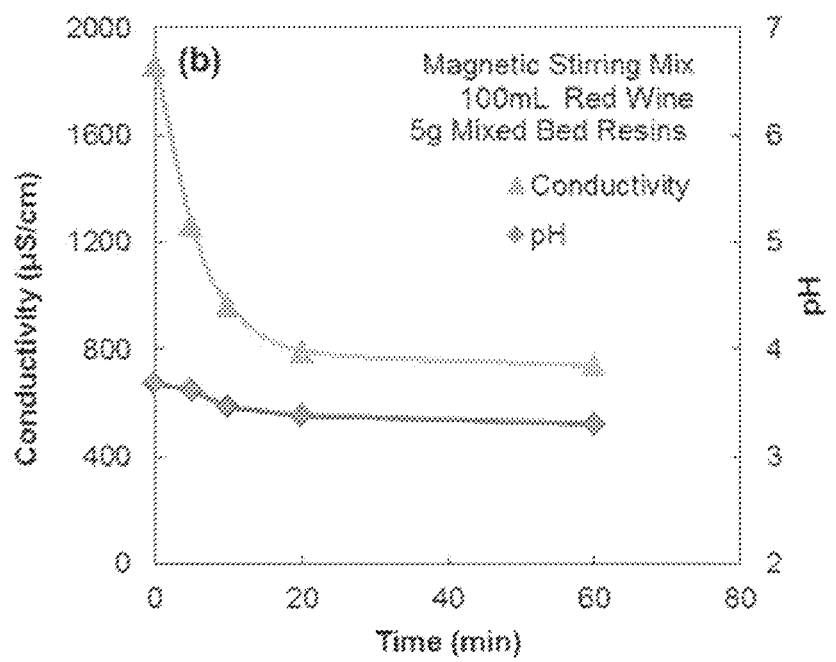

The influence of stirring time on $SO_2$ content was studied and results are shown in FIGS. 13A and 13B. Both free $SO_2$ and total $SO_2$ content declined by first 20 min of mixing. About 20 min was required to reach the equilibrium level.

Figure 14A:
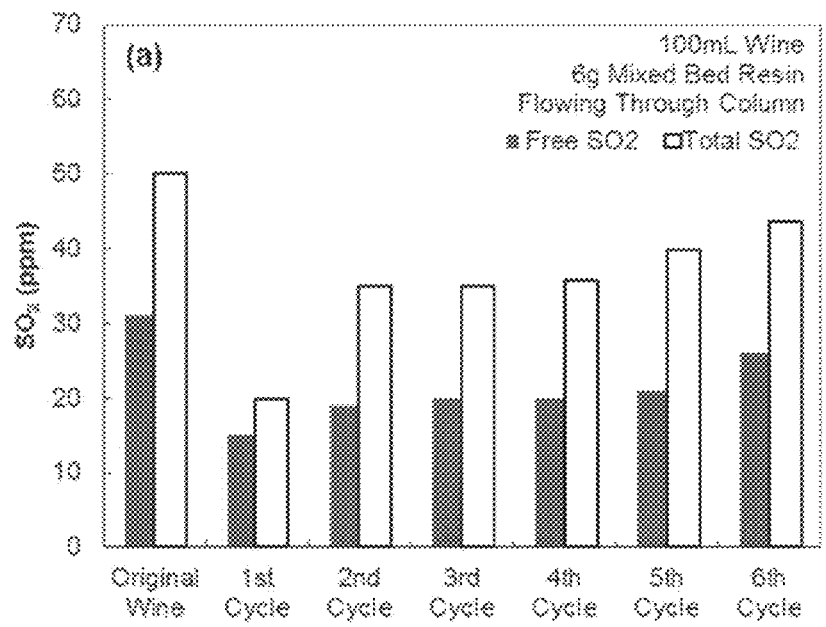
FIGS. 14A and 14B present results showing the removal of $SO_2$ in wine by the flowing through column method, as disclosed in Experiment 4.
Figure 14B:
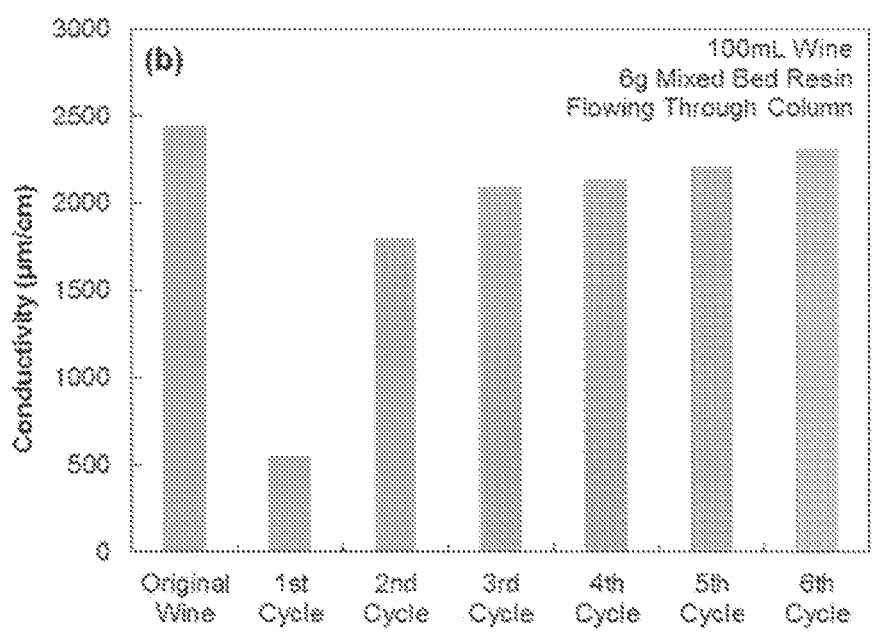

Flowing through (Funnel & Column) Method:

Both flowing through filter funnel and chromatograph column were tried. FIGS. 14A and 14B shows the removal of $SO_2$ by the flow through column method. FIG. 14A shows the concentration of $SO_2$ and FIG. 14B shows the conductivity. In the first cycle, about 60% of $SO_2$ was removed by the ion exchange resins in column. The total $SO_2$ dropped from 50 to 20 ppm. The used resins in column still show the ability to remove $SO_2$ in wine after the 1st cycle. After 4 times recycling, those resins are still able to remove about 30% of $SO_2$ in wine. The flow through funnel method shows similar results with column method. However, it takes longer time for 100 mL of wine to flow through filter funnel (20 min) compared with column (13 min).

Figure 15A:
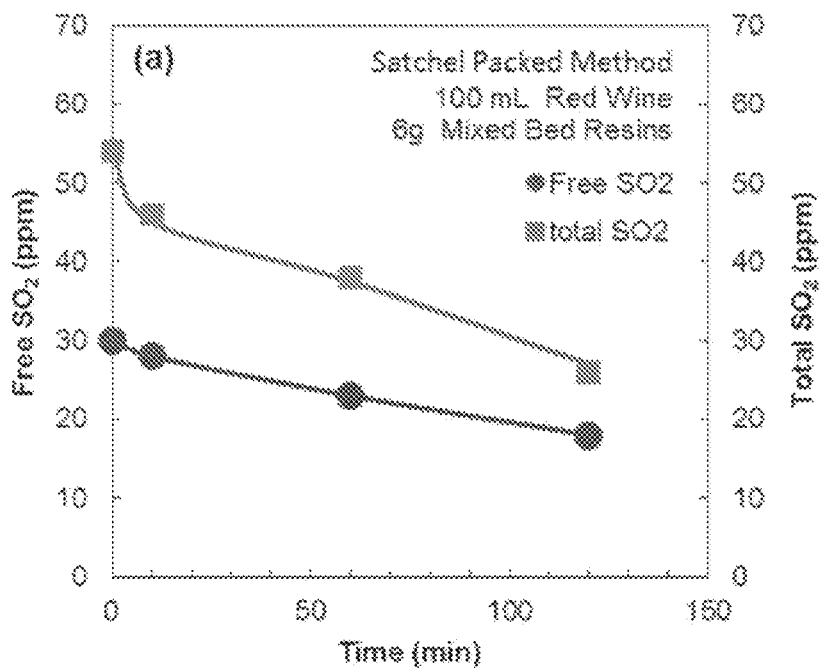
FIGS. 15A and 15B present results showing the removal of $SO_2$ in wine by the satchel packed method, as disclosed in Experiment 4.
Figure 15B:
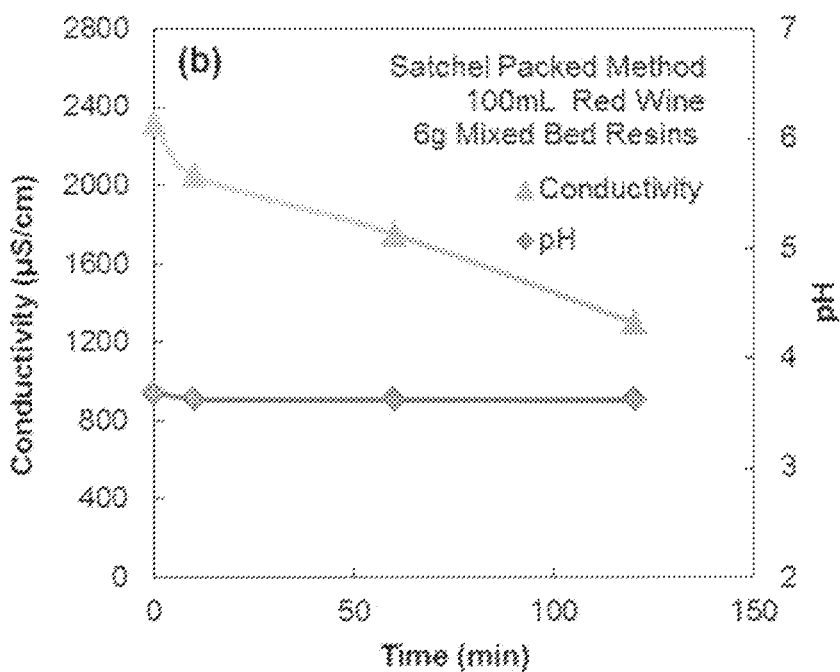

Satchel Packed Method:

FIGS. 15A and 15B present the removal of $SO_2$ in wine by soaking satchel packed resins in wine without stirring with various soaking time. Both free $SO_2$ and total $SO_2$ decrease with a 10 min treatment. However, compared with stirring method and flowing through method, the decrease is slower.

Figure 16A:
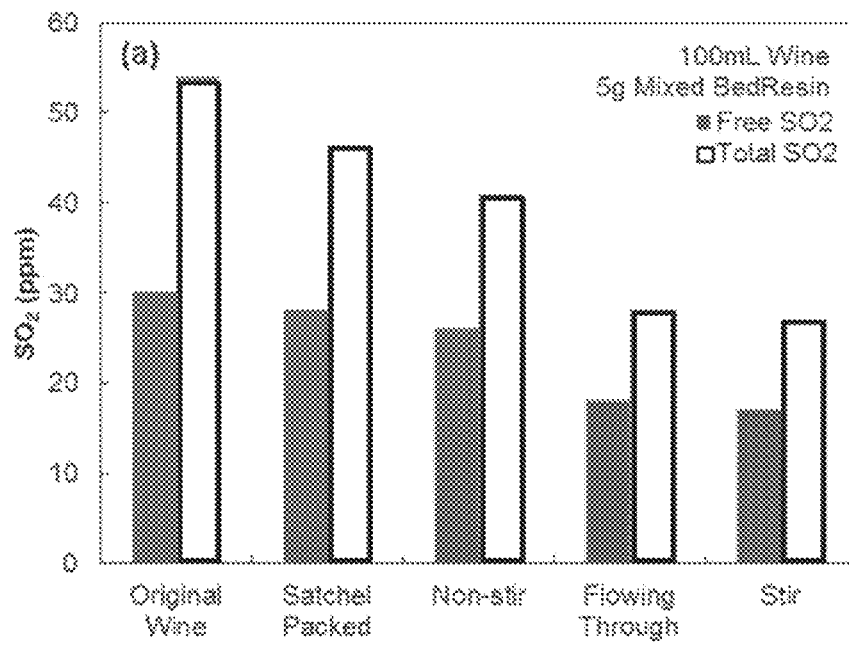
FIGS. 16A and 16B present results showing the comparison of Stirring, Non-stirring, Satchel Packed and flow through (funnel & column) method on $SO_2$ removal, as disclosed in Experiment 4.
Figure 16B:
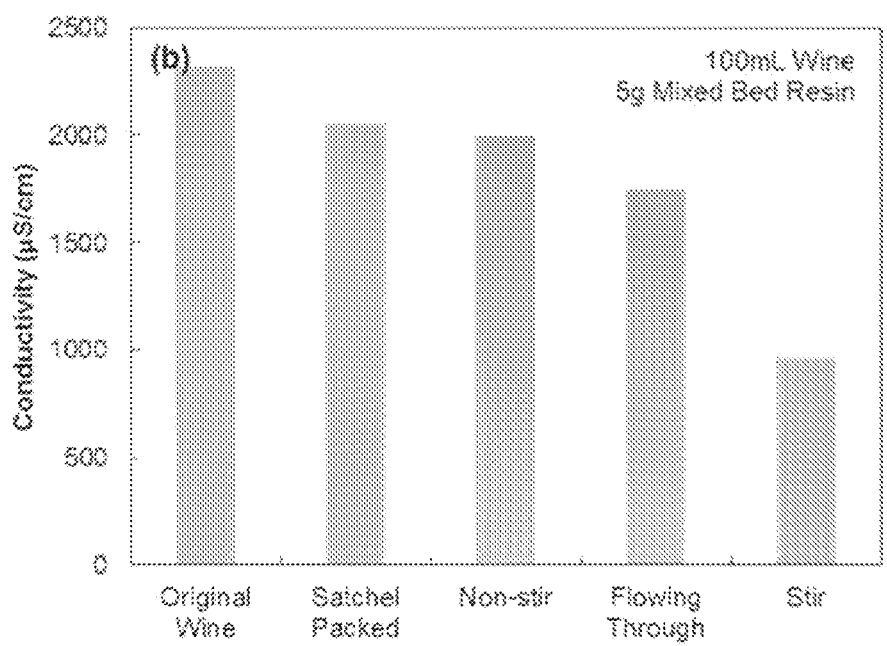

Comparison of Stirring, Non-stirring, Satchel Packed and Flow Through (Funnel & Column) Methods on $SO_2$ Removal:

The free $SO_2$ and total $SO_2$ contents of wine treated by four different methods are shown in the FIGS. 16A and 16B. Satchel Packed method and Non-stir method removes lesser amounts of $SO_2$ in wine as compared to flow through (funnel & column) methods. The flow through method and stir method can remove about 50% of total $SO_2$ content from 54 to 28 ppm. The $SO_2$ content was similar for flow through method and stir method. The non-stir method removed $SO_2$ slightly better than satchel packed method. It is thought that the outer layer of satchel textile, may form a barrier to mass transfer. Comparing methods, it is thought that fluidic flow helps the removal of $SO_2$ to a large extent by transporting ions close to ion exchange beads. However, the flow rate of wine flowing through column is slower (7.69 mL/min), compared with pouring (approximately 2000 mL/min).

Figure 17A:
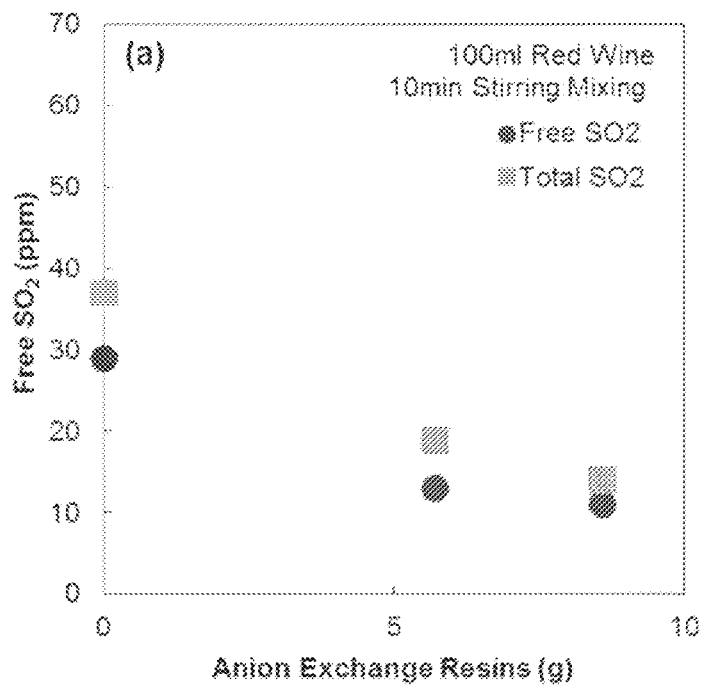
FIGS. 17A and 17B present results showing the comparison of effect of anion (Cl) exchange resin amount on wine $SO_2$ content, conductivity and pH, as disclosed in Experiment 4.
Figure 17B:
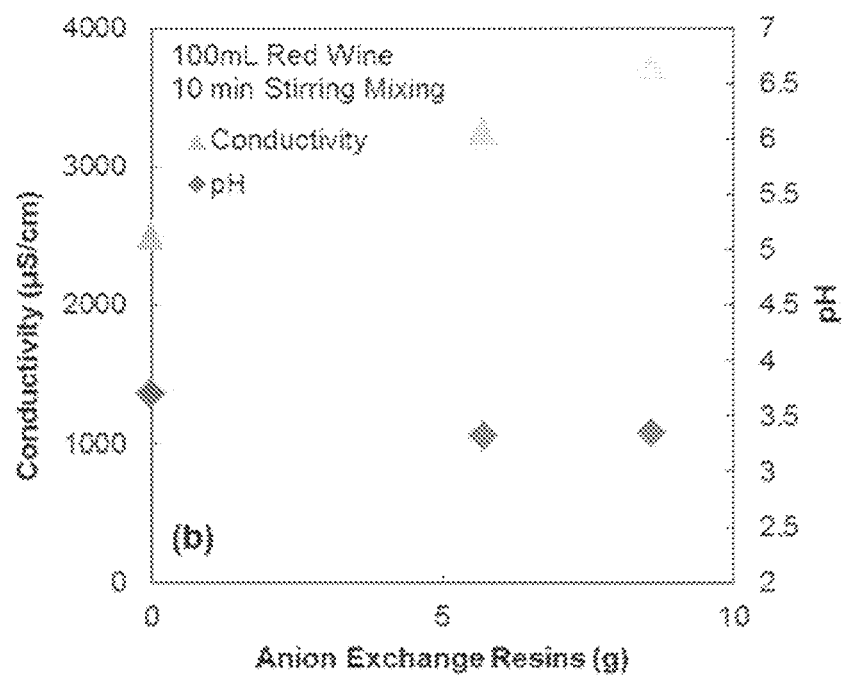

Removal of $SO_2$ by Anion (Cl) Exchange Resin:

Wine was treated with anion (Cl) exchange resins for 10 min with medium stirring. Results are shown in FIGS. 17A and 17B. Cl Anion exchange resin shows similar ability as mixed bed resin to remove both the free $SO_2$ and total $SO_2$ in wine. The conductivity of wine treated with Cl— anion exchange resins was increased from 2.5 mS/cm up to 3.7 mS/cm (see Table 4), while with H/OH mixed bed resin treatment, the conductivity of wine dropped to 0.3 mS/cm. The pH of wine after Cl— anion exchange resin treatment dropped from 3.71 to 3.35.

Figure 18A:
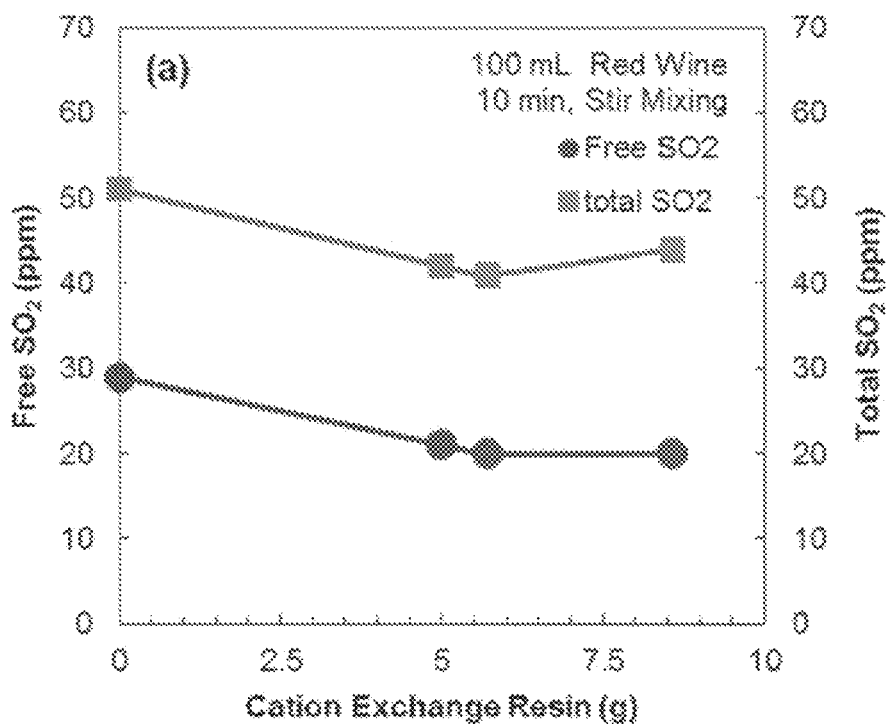
FIGS. 18A and 18B present results showing the effect of cation (Cl) exchange resin amount on wine $SO_2$ content, conductivity and pH, as disclosed in Experiment 4.
Figure 18B:
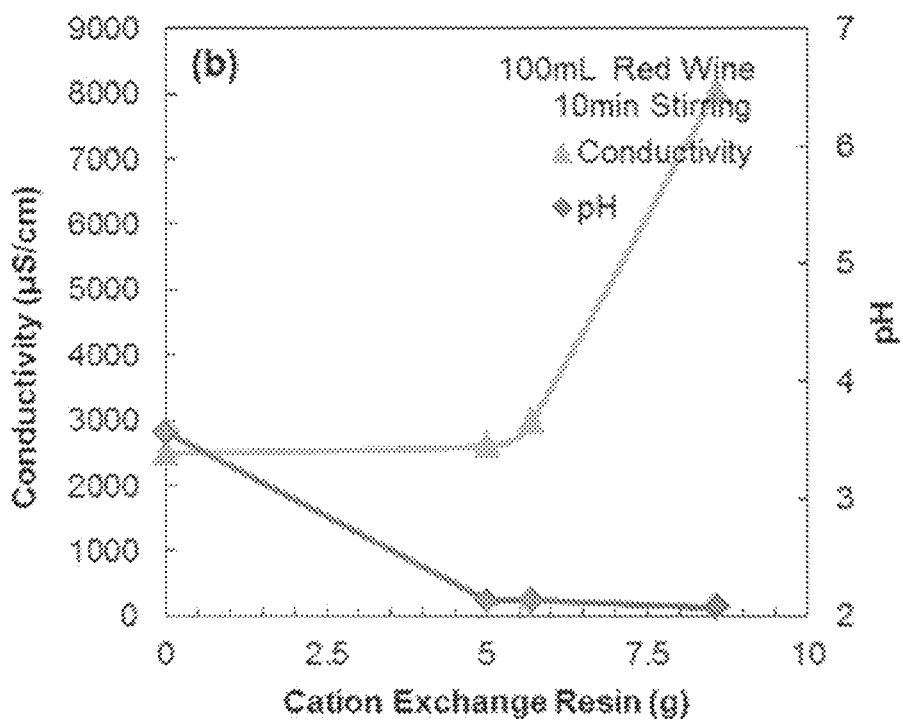

Removal of $SO_2$ by Cation (H) Exchange Resin:

To investigate the mechanism of absorption of $SO_2$ by ion exchange resins, cation (H) exchange resin was employed to remove $SO_2$ content in wine as well. With various amounts of cation exchange resin added to wine, both free and total $SO_2$ content of wine slightly decline as shown in FIGS. 18A and 18B. Adding more cation exchange resins did not further remove $SO_2$ content in wine. The conductivity of wine increases when a large amount of cation exchange resins are added to the system.

Figure 19A:
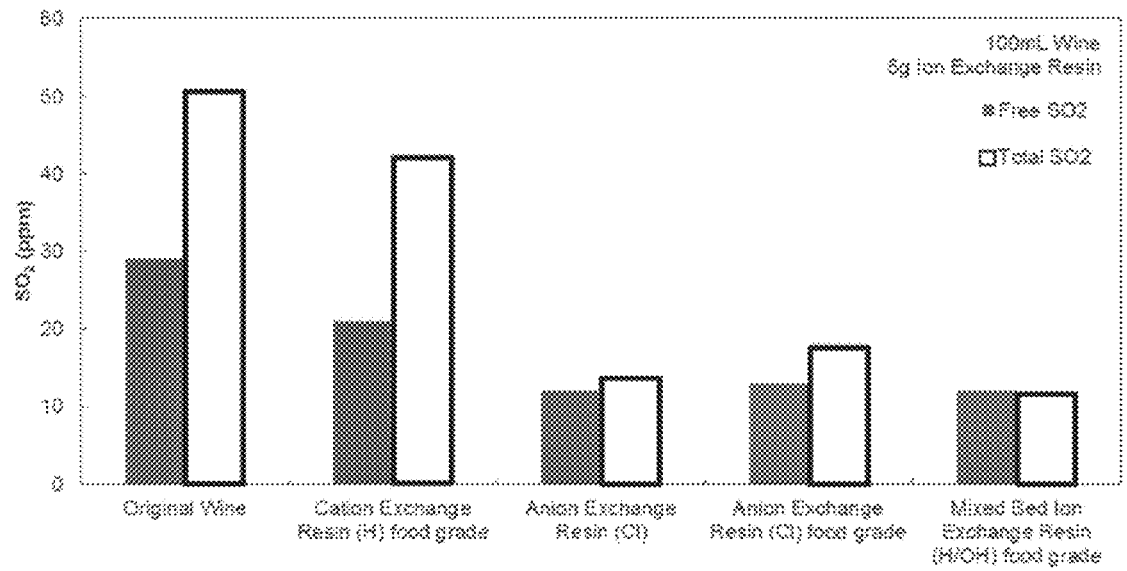
FIGS. 19A and 19B present results showing the ability of four different ion exchange resins to remove $SO_2$ from wine, as disclosed in Experiment 4.
Figure 19B:
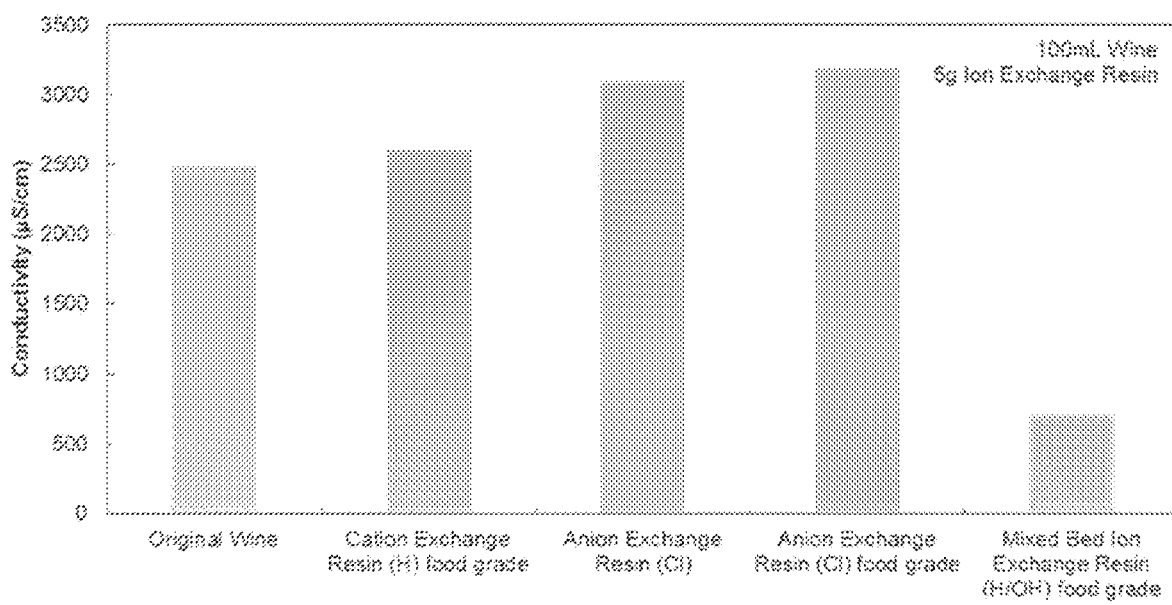

Comparison of Four Different Ion Exchange Resins on the Removal of $SO_2$ from Wine:

The ability of four different ion exchange resins to remove $SO_2$ from wine were compared (FIGS. 19A and 19B). Mixed bed (H/OH) resins presented the highest efficiency of removing $SO_2$ from wine, e.g., lowering the total and free $SO_2$ from 51 and 29 ppm down to 12 ppm. However, mixed bed resins can also decrease the conductivity of wine from 2.49 mS/cm to 0.71 mS/cm, which might affect the wine taste. Compared with mixed bed resins, both anion (Cl) exchange resins used in this research were less efficient. The conductivity of wine treated by anion exchange resins is increased to around 3.1 mS/cm. Cation exchange resins showed lower ability to remove the $SO_2$ from wine.

The results suggest that both free and total $SO_2$ in wine can be removed by mix bed (H/OH) and anion (Cl) exchange resins. The conductivity of wine treated by mixed bed resins decreased, while the conductivity of wine treated by anion exchange resins increased. The capacity of beads binding to sulphite in wine was lower than that in sulphite solution, possibly because of the competition of other ions present in wine binding to beads with sulphite ions. Stirring mixing and flowing through method decreased the $SO_2$ level in wine samples.

Experiment 5

Experiments were performed to test the ability of an embodiment of the ion exchange resin, comprising a mixture on anionic beads and cation ionic beads, to remove noxious constituents from wines. Samples of red wine, "Red", (e.g., Robert Mondavi, Private Selection, Cab Sauv, 2011) and a white wine, "White" (e.g., Francis Coppola, Diamond Collection, Chardonnay, 2012) were tested. The reduction in concentrations of noxious constituents, including histamine and other biogenic amines, sulfites, phenolic compounds, was compared to the concentrations of the noxious constituents in untreated same wine samples. The results shown in Table 6 presents the concentrations (ppm) of the listed noxious constituent for untreated wine samples (preT) and for 150 mL samples of wine that were exposed to about 5 gm of the ion exchange resin for about 15 minutes (Treat). Percentage reductions (%) in the noxious constituent are also presented.

TABLE 6

| Noxious Constituent | Red preT | Red T | % | White preT | White T | % |
|---|---|---|---|---|---|---|
| Free Sulfite | 10 | 7 | 30 | 25 | 9 | 64 |
| Total Sulfite | 40 | 24 | 40 | 75 | 37 | 51 |
| Histamine | 4.63 | 0.64 | 86.2 | 0.25 | <0.1 | >60 |
| Putrescine | 22.48 | 3.01 | 86.6 | 3.33 | 0.37 | 88.9 |

TABLE 6-continued

| Noxious Constituent | Red preT | Red T | % | White preT | White T | % |
|---|---|---|---|---|---|---|
| Cadaverine | 0.69 | 0.1 | 85.5 | 0.42 | <0.1 | >76 |
| Tyramine | 1.16 | 0.42 | 63.8 | <0.1 | <0.1 | — |
| Gallic acid | 39 | 21 | 46.2 | 0.8 | 0.5 | 37.5 |
| Catechin | 5 | 3 | 40.0 | 0.4 | 0.2 | 50 |
| Epicatechin | 5 | 5 | 0.0 | | | |
| Tannin | 597 | 613 | −2.7 | 14.6 | 12.6 | 13.7 |
| Caftaric acid | 9 | 2 | 77.8 | 8.7 | 1.4 | 83.9 |
| Caffeic acid | 6 | 3 | 50.0 | 5.1 | 2.1 | 58.8 |
| Quercetin Glycosides | 21 | 12 | 42.9 | 4.6 | 2 | 56.5 |
| Quercetin | 4 | 2 | 50.0 | | | |
| Malvidin Glucosides | 24 | 21 | 12.5 | | | |
| Polymeric Anthocyanins | 37 | 38 | −2.7 | | | |
| Total Anthocyanins | 83 | 80 | 3.6 | | | |
| Monomeric Anthocyanins | 46 | 42 | 8.7 | | | |
| Resveratrol (cis + trans) | 0.4 | 0.1 | 75.0 | | | |
| Astilbin | | | | 3.5 | 2.9 | 17.1 |
| Grape Reaction Product | | | | 6.9 | 2.2 | 68.1 |
| Quercetin Aclycone | | | | <0.1 | <0.1 | 0 |

Experiments were performed to test the ability of an embodiment of the ion exchange resin, comprising a mixture on anionic beads and cation ionic beads, to remove noxious constituents from beer. The reduction in concentrations of noxious constituents including histamine and other biogenic amines and sulfites was compared to the concentrations of the noxious constituents in untreated same beer samples. The results shown in Table 7 presents the concentrations (ppm) of the listed noxious constituent for untreated beer samples (preT) and for 150 mL samples of beer that were exposed to about 5 gm of two different ion exchange resins for about 15 minutes (T1 and T2). Percentage reductions (%) in the noxious constituent are also presented.

TABLE 7

| Noxious Constituent | Beer preT | Beer T1 | % | Beer T2 | % |
|---|---|---|---|---|---|
| Free Sulfite | <2 | <2 | — | <2 | — |
| Total Sulfite | <5 | <5 | — | <5 | — |
| Histamine | <0.1 | <0.1 | — | <0.1 | — |
| Putrescine | 4.2 | 2.2 | 47.6 | 2.7 | 35.7 |
| Cadaverine | 0.5 | 0.4 | 20.0 | 0.4 | 20.0 |
| Tyramine | 0.9 | 0.5 | 44.4 | 0.5 | 44.4 |

Those skilled in the pertinent arts to which this application relates will appreciate that other and further additions, deletions, substitutions and modifications may be made to the described embodiments.

What is claimed is:

1. A method of treating a non-wine alcoholic beverage, comprising:
   after production and bottling of a non-wine alcoholic beverage, exposing the non-wine alcoholic beverage to an ion exchange matrix that includes a mixture of cation exchange media and anion exchange media that comprise:
   (1) cation exchange media that are in hydrogen form,
   (2) cation exchange media that are in potassium mineral form,
   (3) anion exchange media that are in hydroxide form, and
   (4) anion exchange media that are in chloride mineral form,
   wherein the exposing results in:
   binding ions of the mixture to one or more cationic or anionic constituents present in the non-wine alcoholic beverage;
   reducing concentration of the one or more cationic or anionic constituents in the non-wine alcoholic beverage; and
   maintaining a conductivity of the non-wine alcoholic beverage equal to or greater than a pretreatment conductivity value of the non-wine alcoholic beverage measured prior to exposure of the cation and anion exchange media of (1), (2), (3) and (4), and, wherein the ion exchange matrix further includes anti-allergenic ingredient including one or more of anti-histamines or vasoconstrictors bound thereto, the anti-allergenic ingredient being released from the ion exchange matrix when the non-wine alcoholic beverage is exposed to the ion exchange matrix.

2. The method of claim 1, wherein the non-wine alcoholic beverage is a beer formed in a fermentation process.

3. The method of claim 2, wherein the beer after the exposing has an at least 20 percent reduction in at least one of the cationic constituents including one or more of putrescine, cadaverine or tyramine.

4. The method of claim 1, wherein the reducing concentration of the one or more cationic or anionic constituents comprises a reducing concentration of sulfite.

5. The method of claim 1, wherein the reducing concentration of the one or more cationic or anionic constituents comprises a reducing concentration of histamine.

6. The method of claim 1, wherein the reducing concentration of the one or more cationic or anionic constituents comprises a reducing concentration of tyramine, putrescine, or cadaverine.

* * * * *